United States Patent
Park et al.

(10) Patent No.: US 10,754,199 B2
(45) Date of Patent: Aug. 25, 2020

(54) LIQUID CRYSTAL COMPOSITION, LIQUID CRYSTAL DISPLAY DEVICE USING THE LIQUID CRYSTAL COMPOSITION, AND METHOD OF MANUFACTURING THE LIQUID CRYSTAL DISPLAY DEVICE

(71) Applicant: Samsung Display Co., Ltd., Yongin-si, Gyeonggi-do (KR)

(72) Inventors: Heung Shik Park, Seoul (KR); Kyeong Jong Kim, Suwon-si (KR); Ki Chul Shin, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 121 days.

(21) Appl. No.: 15/961,462

(22) Filed: Apr. 24, 2018

(65) Prior Publication Data

US 2019/0121178 A1 Apr. 25, 2019

(30) Foreign Application Priority Data

Oct. 25, 2017 (KR) .................. 10-2017-0139081

(51) Int. Cl.
| | | |
|---|---|---|
| *G02F 1/1333* | (2006.01) | |
| *G02F 1/1337* | (2006.01) | |
| *G02F 1/1335* | (2006.01) | |
| *C09K 19/56* | (2006.01) | |
| *C09K 19/32* | (2006.01) | |
| *C09K 19/34* | (2006.01) | |
| *C09K 19/14* | (2006.01) | |
| *C09K 19/30* | (2006.01) | |
| *C09K 19/06* | (2006.01) | |
| *C09K 19/54* | (2006.01) | |

(52) U.S. Cl.
CPC .......... *G02F 1/1337* (2013.01); *C09K 19/062* (2013.01); *C09K 19/14* (2013.01); *C09K 19/3028* (2013.01); *C09K 19/32* (2013.01); *C09K 19/3491* (2013.01); *C09K 19/56* (2013.01); *G02F 1/133512* (2013.01); *G02F 1/133514* (2013.01); *G02F 1/133536* (2013.01); *C09K 2019/3425* (2013.01); *C09K 2019/548* (2013.01); *G02F 2201/121* (2013.01); *G02F 2201/123* (2013.01)

(58) Field of Classification Search
CPC .. C09K 19/062; C09K 19/14; C09K 19/3028; C09K 19/32; C09K 19/3491; C09K 19/56; C09K 2019/3425; C09K 2019/548; C09K 2019/121; C09K 2019/123; G02F 1/1333; G02F 1/1337; G02F 1/133512; G02F 1/133514; G02F 1/133536
USPC ...................................... 252/299.01
See application file for complete search history.

(56) References Cited

U.S. PATENT DOCUMENTS

| | | |
|---|---|---|
| 9,448,438 B2 | 9/2016 | Park et al. |
| 9,659,965 B2 | 5/2017 | Park et al. |
| 2019/0121178 A1 * | 4/2019 | Park ............ G02F 1/1337 |

FOREIGN PATENT DOCUMENTS

| | | |
|---|---|---|
| KR | 10-2015-0030026 A | 3/2015 |
| KR | 10-2016-0031942 A | 3/2016 |
| KR | 10-2016-0103315 A | 9/2016 |
| KR | 10-2017-0040291 A | 4/2017 |

* cited by examiner

*Primary Examiner* — Geraldina Visconti
(74) *Attorney, Agent, or Firm* — Kile Park Reed & Houtteman PLLC

(57) ABSTRACT

A liquid crystal composition, a liquid crystal display (LCD) device using the liquid crystal composition, and a method of manufacturing an LCD device are provided. The liquid crystal display device comprises: a first substrate; a liquid crystal layer disposed on the first substrate, the liquid crystal layer including a liquid crystal compound; and a first liquid crystal alignment layer disposed between the first substrate and the liquid crystal layer, wherein the first compound includes a first compound, which has at least one hydrophilic group bonded to one end of a core structure thereof and a benzoyl derivative moiety bonded to the other end of the core structure thereof.

19 Claims, 17 Drawing Sheets

LIQUID CRYSTAL COMPOSITION, LIQUID CRYSTAL DISPLAY DEVICE USING THE LIQUID CRYSTAL COMPOSITION, AND METHOD OF MANUFACTURING THE LIQUID CRYSTAL DISPLAY DEVICE

This application claims priority from Korean Patent Application No. 10-2017-0139081 filed on Oct. 25, 2017 in the Korean Intellectual Property Office, and all the benefits accruing therefrom under 35 U.S.C. 119, the disclosure of which in its entirety is herein incorporated by reference.

BACKGROUND

1. Field

The present disclosure relates to a liquid crystal composition, a liquid crystal display (LCD) device using the liquid crystal composition, and a method of manufacturing the LCD device.

2. Description of the Related Art

The importance of display devices has steadily grown with recent developments in multimedia technology. As a result, a variety of display devices such as a liquid crystal display (LCD) device, an organic light-emitting display device, and the like have been developed and widely used.

The LCD device, which is one of the most widely-used flat panel displays, includes: a display panel having two substrates, on which field-generating electrodes such as pixel electrodes and a common electrode are formed, and a liquid crystal layer, which is interposed between the two substrates; and a light source unit which provides light to the display panel. The LCD device realigns liquid crystal in the liquid crystal layer by applying voltages to the field-generating electrodes, and thereby controls the amount of light transmitted through the liquid crystal layer, in units of pixels, so as to display an image.

SUMMARY

In order to control the amount of light transmitted through the liquid crystal layer, the liquid crystal in the liquid crystal layer need to be initially aligned in a particular direction. The degree of uniformity in the alignment of the liquid crystal is one of the most important factors for determining the display quality of the LCD device. As a way to align the liquid crystal, a liquid crystal alignment layer using a polyimide (PI)-based polymer may be used.

However, there is a clear limit in improving the display quality of the LCD device using the PI-based alignment layer. Specifically, the PI-based alignment layer has low thermal stability and low film rigidity and may thus cause problems associated with alignment stability and afterimages. Also, the formation of the PI-based alignment layer requires high-temperature thermal treatment, which, however, may cause thermal damage to the elements in the display panel.

Exemplary embodiments of the present disclosure provide a liquid crystal display (LCD) device having the initial alignment of liquid crystal stabilized without the use of a polyimide (PI)-based alignment layer.

Exemplary embodiments of the present disclosure also provide a method of manufacturing an LCD device, which is capable of minimizing the number of thermal treatment processes.

Exemplary embodiments of the present disclosure also provide a liquid crystal composition capable of stabilizing the initial alignment of liquid crystal.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the invention, there is provided a liquid crystal display device. The liquid crystal display device comprises: a first substrate; a liquid crystal layer disposed on the first substrate, the liquid crystal layer including a liquid crystal compound; and a first liquid crystal alignment layer disposed between the first substrate and the liquid crystal layer, wherein the first compound includes a first compound, which has at least one hydrophilic group bonded to one end of a core structure thereof and a benzoyl derivative moiety bonded to the other end of the core structure thereof.

In an exemplary embodiment, the core structure of the first compound may include a mesogenic skeleton, and the benzoyl derivative moiety of the first compound may be represented by any one of Formulas Ia through Ie:

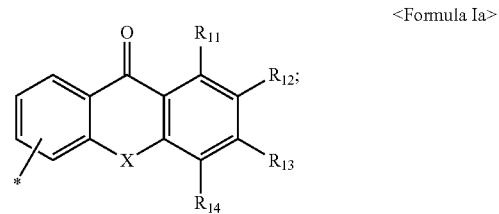
<Formula Ia>

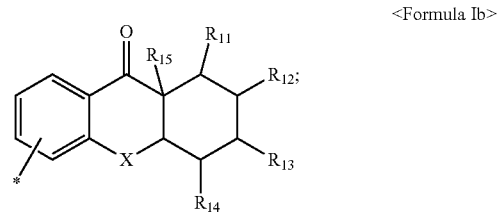
<Formula Ib>

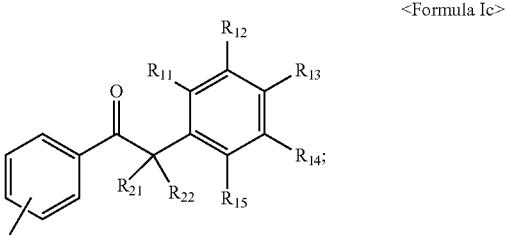
<Formula Ic>

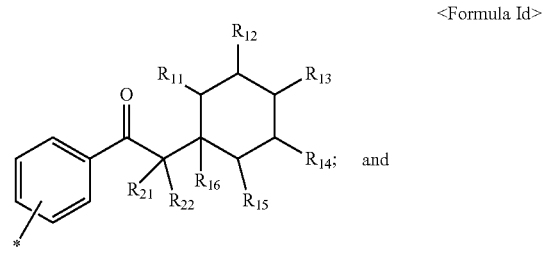
<Formula Id> and

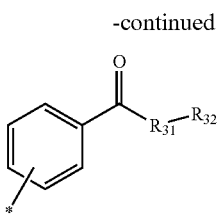

<Formula Ie>

(where $R_{11}$, $R_{12}$, $R_{13}$, $R_{14}$, $R_{15}$, and $R_{16}$ are each independently hydrogen, a hydroxyl group, a $C_{1-5}$ alkyl group or a $C_{1-5}$ alkoxy group, $R_{21}$ and $R_{22}$ are each independently hydrogen, a hydroxyl group, a $C_{1-5}$ alkyl group or a $C_{1-5}$ alkoxy or phenyl group, $R_{31}$ is a straight or branched $C_{1-5}$ alkylene group, $R_{32}$ is hydrogen or a hydroxyl group, and X is absent, or is oxygen, sulfur, or a carbonyl group).

In an exemplary embodiment, the first liquid crystal alignment layer may further include, a polymer of a second compound, the second compound has at least one hydrophilic group bonded to one end of a core structure thereof and a polymerizable group bonded to the other end of the core structure thereof, or a polymer of a third compound, the third compound has polymerizable groups bonded to both ends of a core structure thereof.

In an exemplary embodiment, the polymerizable group of the second compound and the polymerizable groups of the third compounds may be each independently acryloyl groups, methacryloyl groups, acrylate groups, or methacrylate groups.

In an exemplary embodiment, the first liquid crystal alignment layer may further include, a fourth compound, the fourth compound has at least one hydrophilic group bonded to one end of a core structure thereof and an aliphatic or aromatic hydrocarbon moiety bonded to the other end of the core structure thereof.

In an exemplary embodiment, the first compound, the second compound, and the fourth compound may be aligned so as for the hydrophilic groups thereof to be oriented toward the first substrate, and liquid crystals may be induced by the first liquid crystal alignment layer to be vertically aligned.

In an exemplary embodiment, the LCD device may further comprise: electrodes disposed between the first substrate and the first liquid crystal alignment layer, wherein the first liquid crystal alignment layer may be in contact with the electrodes and the liquid crystal layer.

In an exemplary embodiment, the liquid crystal layer may further include, a first compound, the first compound has at least one hydrophilic group bonded to one end of a core structure thereof and a benzoyl derivative moiety bonded to the other end of the core structure thereof, a second compound, the second compound has at least one hydrophilic group bonded to one end of a core structure thereof and a polymerizable group bonded to the other end of the core structure thereof, a third compound, the third compound has polymerizable groups bonded to both ends of a core structure thereof, and a fourth compound, the fourth compound has at least one hydrophilic group bonded to one end of a core structure thereof and an aliphatic or aromatic hydrocarbon moiety bonded to the other end of the core structure thereof.

In an exemplary embodiment, the LCD device may further comprise: a second substrate disposed on the liquid crystal layer; and a second liquid crystal alignment layer disposed between the liquid crystal layer and the second substrate, wherein the second liquid crystal alignment layer may include, a first compound, the first compound has at least one hydrophilic group bonded to one end of a core structure thereof and a benzoyl derivative moiety bonded to the other end of the core structure thereof; a polymer of a second compound or a third compound, the second compound has at least one hydrophilic group bonded to one end of a core structure thereof and a polymerizable group bonded to the other end of the core structure thereof, the third compound has polymerizable groups bonded to both ends of a core structure thereof, and a fourth compound, the fourth compound has at least one hydrophilic group bonded to one end of a core structure thereof and an aliphatic or aromatic hydrocarbon moiety bonded to the other end of the core structure thereof.

In an exemplary embodiment, a surface of the first substrate that faces the second substrate may have a concave curved surface, and the surface roughness of the first liquid crystal alignment layer may be greater than the surface roughness of the second liquid crystal alignment layer.

According to an exemplary embodiment of the invention, there is provided a method of manufacturing an LCD device. The method comprises: preparing first and second substrates; and forming a liquid crystal layer between the first and second substrates by providing a liquid crystal composition including liquid crystal and a first compound, the first compound has at least one hydrophilic group bonded to one end of a core structure thereof and a benzoyl derivative moiety bonded to the other end of the core structure thereof.

In an exemplary embodiment, the liquid crystal composition may further include a second compound, the second compound has at least one hydrophilic group bonded to one end of a core structure thereof and a polymerizable group bonded to the other end of the core structure thereof, a third compound, the third compound has polymerizable groups bonded to both ends of a core structure thereof, and a fourth compound, the fourth compound has at least one hydrophilic group bonded to one end of a core structure thereof and an aliphatic or aromatic hydrocarbon moiety bonded to the other end of the core structure thereof.

In an exemplary embodiment, providing the liquid crystal composition may comprise providing the liquid crystal composition to be placed in contact with electrodes exposed on the first or second substrate.

In an exemplary embodiment, forming the liquid crystal layer may comprise: forming a first alignment layer by aligning at least some of the first, second, and fourth compounds so as for the hydrophilic groups thereof to be oriented toward the first substrate; and forming a second alignment layer by aligning at least some of the first, second, and fourth compounds so that the hydrophilic groups thereof will be oriented toward the second substrate.

In an exemplary embodiment, the method may further comprise: applying light with an electric field applied to the liquid crystal layer, wherein the first substrate may include a first base substrate and switching elements disposed on the first base substrate, the second substrate may include a second base substrate, first wavelength band filters disposed on the second base substrate, and a second wavelength band filter disposed to overlap with the first wavelength band filters, a wavelength band of light that the first wavelength band filters allow to be transmitted may overlap with a wavelength band of light that the second wavelength band filters blocks from being transmitted, and the applying light, may comprise applying light from the first substrate toward the liquid crystal layer.

In an exemplary embodiment, the method may further comprise: applying light with an electric field applied to the liquid crystal layer, wherein the applying light, may comprise polymerizing the second compound or the third compound by generating free radicals from the benzoyl derivative moiety bonded to the other end of the first compound.

In an exemplary embodiment, the method may further comprise, before the providing the liquid crystal composition: hydrophilically treating a surface of the first or second substrate so that the surface of the first or second substrate have a contact angle of about 70° or less with respect to distilled water, wherein the hydrophilicity of the surface of the first substrate, placed in contact with the liquid crystal composition, may differ from the hydrophilicity of the surface of the second substrate, placed in contact with the liquid crystal composition.

According to an exemplary embodiment of the invention, there is provided a liquid crystal composition. The liquid crystal composition comprises: a liquid crystal compound; and a first compound having at least one hydrophilic group bonded to one end of a core structure thereof and a benzoyl derivative moiety bonded to the other end of the core structure thereof.

In an exemplary embodiment, the liquid crystal composition may further comprise: a second compound, the second compound has at least one hydrophilic group bonded to one end of a core structure thereof and a polymerizable group bonded to the other end of the core structure thereof; a third compound, the third compound has polymerizable groups bonded to both ends of a core structure thereof; and a fourth compound, the fourth compound has at least one hydrophilic group bonded to one end of a core structure thereof and an aliphatic or aromatic hydrocarbon moiety bonded to the other end of the core structure thereof.

In an exemplary embodiment, the first compound may be contained in an amount of about 0.1 wt % to about 30.0 wt % based on the sum of the weights of the first compound, the second compound, the third compound, and the fourth compound, and the third compound may be contained in an amount of about 0.1 wt % to about 0.8 wt % based on the total weight of the liquid crystal composition.

The LCD device has excellent stability in connection with the initial alignment of liquid crystal, and is capable of improving voltage holding ratio by minimizing the content of impurities in a liquid crystal layer.

In addition, the method of manufacturing an LCD device does not involve a process of forming a PI-based liquid crystal alignment layer in a display panel and can thus minimize thermal damage to the elements in a display panel. Also, the method of manufacturing an LCD device can form alignment layers with a relatively small amount of exposure and can thus improve processability.

The liquid crystal composition contains a compound comprising a benzoyl derivative moiety bonded to the core structure thereof and can thus exhibit excellent sensitivity to light.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
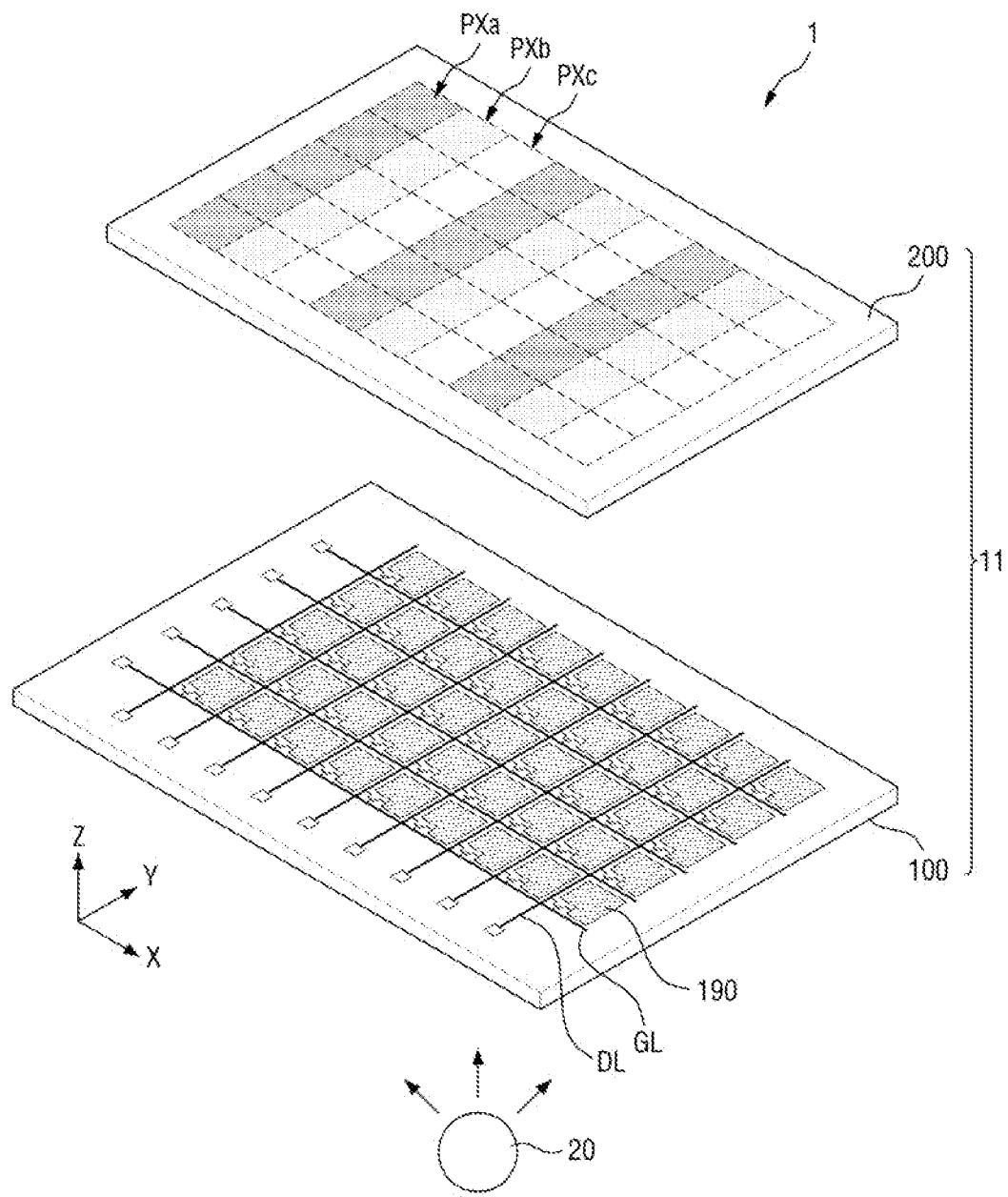
FIG. 1 is an exploded perspective view of a liquid crystal display (LCD) device according to an exemplary embodiment of the present disclosure.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

Exemplary embodiments of the present disclosure will hereinafter be described with reference to the accompanying drawings.

Figure 2:
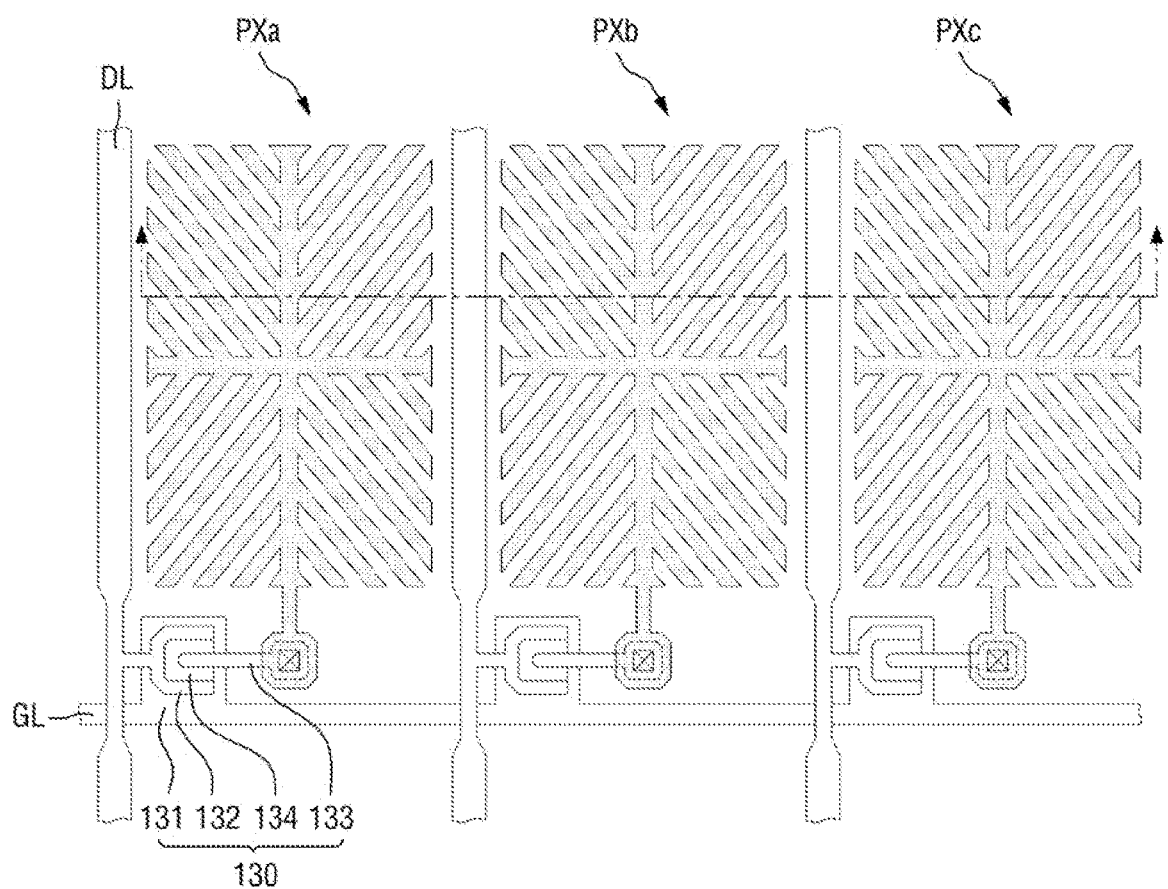
FIG. 2 is a layout view illustrating arbitrary pixels of the LCD device of FIG. 1.
Figure 3:
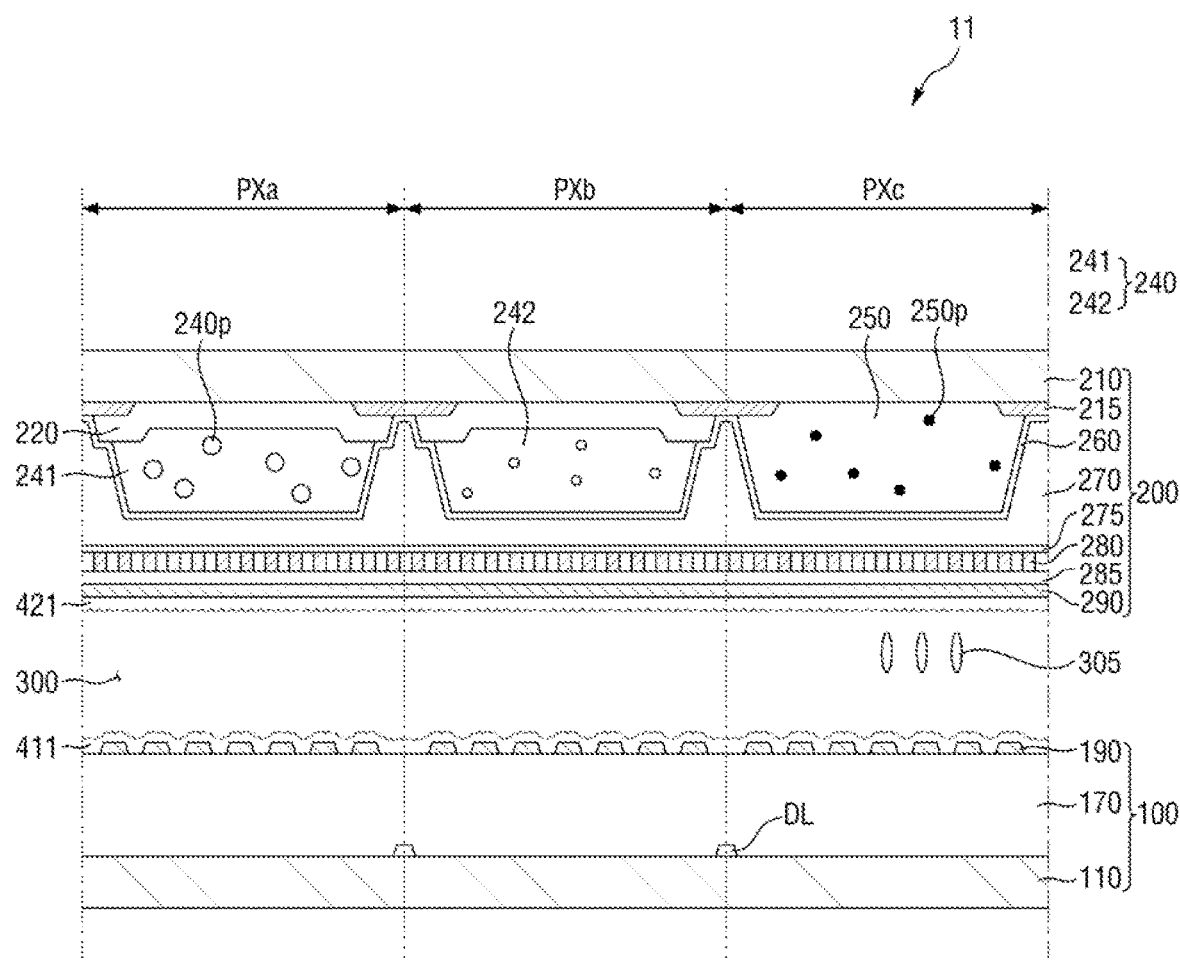
FIG. 3 is a cross-sectional view taken along line III-III' of FIG. 2.

FIG. 1 is an exploded perspective view of a liquid crystal display (LCD) device according to an exemplary embodiment of the present disclosure. FIG. 2 is a layout view illustrating arbitrary pixels of the LCD device of FIG. 1. FIG. 3 is a cross-sectional view taken along line III-III' of FIG. 2.

Referring to FIGS. 1 through 3, an LCD device 1 includes a display panel 11 and a light source unit 20, which provides light to the display panel 11.

The display panel 11 may include a first substrate 100, a second substrate 200, which faces the first substrate 100, and a liquid crystal layer 300, which is interposed between the first and second substrates 100 and 200. The liquid crystal layer 300 may be sealed by the first and second substrates 100 and 200 and a sealing member (not illustrated), which bonds the first and second substrates 100 and 200 together. The display panel 11 may further include a first liquid crystal alignment layer 411, which is disposed between the first substrate 100 and the liquid crystal layer 300, and a second liquid crystal alignment layer 421, which is disposed between the second substrate 200 and the liquid crystal layer 300.

A plurality of pixels (PXa, PXb, and PXc), which are arranged in a matrix in a plan view, may be defined on the display panel 11. As used herein, the term "pixel" refers to a single area for displaying a color, obtained by dividing a display area in a plan view, and a pixel may display a predetermined basic color. A pixel may be the minimum unit of the display panel 11, capable of displaying a color independently of other pixels.

The pixels (PXa, PXb, and PXc) may include a first pixel PXa, which displays a first color, a second pixel PXb, which displays a second color having a shorter peak wavelength than the first color, and a third pixel PXc, which displays a third color having a shorter peak wavelength than the second color. In one exemplary embodiment, the first, second, and third pixels PXa, PXb, and PXc are alternately arranged along a first direction X, and each of the first, second, and third pixels PXa, PXb, and PXc may be repeatedly arranged along a second direction Y.

For example, the first pixel PXa may be a pixel displaying a red color having a peak wavelength of about 610 nm to 650 nm, the second pixel PXb, which is disposed adjacent to the first pixel PXa in the first direction X, may be a pixel displaying a green color having a peak wavelength of about 530 nm to 570 nm, and the third pixel PXc, which is disposed adjacent to the second pixel PXb in the first direction X, may be a pixel displaying a blue color having a peak wavelength of about 430 nm to 470 nm. However, the present disclosure is not limited to this example.

The display panel 11 may include a plurality of gate lines GL, which extend in the first direction X, and a plurality of data lines DL, which extend in the second direction Y and are disposed to be insulated from the gate lines GL. The gate lines GL and the data lines DL may be connected to drivers (not illustrated) and may thus transmit driving signals to pixel electrodes 190 disposed in the pixels (PXa, PXb, and PXb), respectively.

The light source unit 20 may be disposed below the display panel 11 and may emit light having a predetermined wavelength toward the display panel 11. The light source unit 20 may include light sources that directly emit light, and a light guide plate (not illustrated) that guides light emitted by the light sources toward the display panel 11. In one exemplary embodiment, the light sources may be light-emitting diodes (LEDs) displaying light of the third color that has a shorter peak wavelength than the first and second colors (for example, blue light).

Although not specifically illustrated, one or more optical sheets (not illustrated) may be disposed between the display panel 11 and the light source unit 20. The optical sheets may include at least one of a prism sheet, a diffusion sheet, a (reflective) polarization sheet, a lenticular lens sheet, and a micro-lens sheet. The optical sheets may improve the display quality of the LCD device 1 by modulating the optical characteristics (for example, condensation, diffusion, scattering, or polarization characteristics) of light traveling from the light source unit 20 to the display panel 11.

The display panel 11 will hereinafter be described.

The display panel 11 may include first and second substrates 100 and 200, which face each other. The first substrate 100 may be a lower substrate, and the second substrate 200 may be an upper substrate.

The first substrate 100 may include a first base substrate 110, switching elements 130 that are disposed on one surface (for example, the top surface in FIG. 3) of the first base substrate 110, and the pixel electrodes 190, which are disposed on the switching elements 130.

The first base substrate 110 may be a transparent insulating substrate. For example, the first base substrate 110 may be a substrate formed of a glass material, a quartz material, or a transparent plastic material. In some exemplary embodiments, the first base substrate 110 may have flexibility, and the LCD device 1 may be a curved display device.

The switching elements 130 may be disposed on the first base substrate 110. The switching elements 130 may be disposed in the pixels (PXa, PXb, and PXc), respectively, and may transmit driving signals to, or block the transmission of the driving signals to, the pixel electrodes 190. In one exemplary embodiment, each of the switching elements 130 may be a thin-film transistor (TFT) having a control terminal 131, which is connected to one of the gate lines GL and is provided with a gate driving signal, an input terminal 132, which is connected to one of the data lines DL and is provided with a data driving signal, an active layer 134, which turns on or off a channel in accordance with a signal applied to the control terminal 131, and an output terminal 133, which is connected to one of the pixel electrodes 190.

An intermediate layer 170 may be disposed on the switching elements 130. The intermediate layer 170 may electrically insulate the elements thereabove from the elements therebelow and may planarize height differences on the elements stacked on the first base substrate 110. The intermediate layer 170 may include one or more layers. For example, the intermediate layer 170 may have a single-layer structure or a stack of multiple layers. The intermediate layer 170 may comprise an organic material and/or an inorganic material. In a non-limiting example, the intermediate layer 170 may be at least partially exposed on the surface (for example, the top surface in FIG. 3) of the first substrate 100 that faces the second substrate 200.

The pixel electrodes 190 may be disposed on the intermediate layer 170. The pixel electrodes 190 may form an electric field in the liquid crystal layer 300 with a common electrode 290 and may thus realign liquid crystal 305 in the liquid crystal layer 300. Although not specifically illustrated, the pixel electrodes 190 may be electrically connected to the output terminals 133 of the switching elements 130 via contact holes, which are formed in the intermediate layer 170. The pixel electrodes 190 may be disposed in the pixels (PXa, PXb, and PXc), respectively, and may be provided with voltages independently of one another via the switching elements 130. The pixel electrodes 190 may be transparent electrodes formed of a transparent conductive material. Examples of the material for forming the transparent conductive material include indium tin oxide (ITO) and indium zinc oxide (IZO). FIG. 2 illustrates an example in which each of the pixel electrodes 190 includes a stem electrode, which is substantially in a cross shape, and a plurality of slit electrodes, which extend radially from the stem electrode, and defines a plurality of domains, but the present disclosure is not limited thereto. In a non-limiting example, the pixel electrodes 190 may be exposed on the surface (for example, the top surface in FIG. 3) of the first substrate 100 that faces the second substrate 200.

The second substrate 200 will hereinafter be described. The second substrate 200 may include a second base substrate 210, a color conversion pattern layer 240 that is disposed on one surface (for example, the bottom surface in FIG. 3) of the second base substrate 210, and the common electrode 290 that is disposed on the color conversion pattern layer 240, and may further include first and second wavelength band filters 220 and 260.

The second base substrate 210, like the first base substrate 110, may be a transparent insulating substrate. The second base substrate 210 may have flexibility. Light-shielding members 215 may be disposed on the second base substrate 210. The light-shielding members 215 may block the transmission of light. The light-shielding members 215 may be substantially in a lattice shape in plan view. The light-shielding members 215 may be disposed along the boundaries between the pixels (PXa, PXb, and PXc) and may prevent color mixing defects between pairs of adjacent pixels. The light-shielding members 215 may be formed of a black matrix material or an opaque metal material.

The first wavelength band filters 220 may be disposed on the light-shielding members 215. The first wavelength band filters 220 may be selective optical filters allowing the transmission of light of a particular wavelength band while blocking the transmission of light of another particular wavelength band. In one exemplary embodiment, the first wavelength band filters 220 may selectively transmit light having a longer peak wavelength than the peak wavelength of the third color provided by the light source unit 20, and may absorb light of a wavelength band including the peak wavelength of the third color. For example, the first wavelength band filters 220 may be color filters or distributed Bragg reflectors.

The first wavelength band filters 220 may be disposed in the first pixel PXa and/or the second pixel PXb, but not in the third pixel PXc. The first wavelength band filters 220 may block the transmission of light of the third color, transmitted through without being color-converted by the color conversion pattern layer 240, among other beams of light of the third color provided by the light source unit 20 to be incident upon the color conversion pattern layer 240. As a result, the purity of the colors displayed by the first and second pixels PXa and PXb can be enhanced, and the display quality of the LCD device 1 can be improved.

The color conversion pattern layer 240 may be disposed on the first wavelength band filters 220. The color conversion pattern layer 240 may change the color of incident light. That is, after being transmitted through the color conversion pattern layer 240, the incident light may be converted into light of a predetermined wavelength band. In one exemplary embodiment, the color conversion pattern layer 240 may include a base resin and a material dispersed in the base resin to convert or shift the peak wavelength of the incident light to a predetermined peak wavelength, i.e., a wavelength shift material 240p. Examples of the wavelength shift material 240p include quantum dots, quantum rods, or a phosphor material. For example, a quantum dot material may emit a particular color in response to the transition of the electrons thereof from a conduction band to a valence band. The quantum dot material may have a core-shell structure. The core of the quantum dot material may be a semiconductor nanocrystalline material. Examples of the core of the quantum dot material include silicon (Si)-based nanocrystals, Group II-VI compound nanocrystals, and Group III-V compound nanocrystals, but the present invention is not limited thereto. In another exemplary embodiment, the color conversion pattern layer 240 may be a color filter that transmits light of a particular wavelength band while absorbing light of another particular wavelength band so as to selectively transmit only part of the wavelength band of the incident light.

The color conversion pattern layer 240 may include first and second color conversion patterns 241 and 242. Specifically, the first color conversion pattern 241 may be disposed in the first pixel PXa, and the second color conversion pattern 242 may be disposed in the second pixel PXb. Light transmitted through the first color conversion pattern 241 may display the first color, and light transmitted through the second color conversion pattern 242 may display the second color.

In a non-limiting example, the wavelength shift material 240p may have a greater size (particularly, a greater particle size) in the first color conversion pattern 241 than in the second color conversion pattern 242. For example, the wavelength shift material 240p may have a size of about 55 Å to 65 Å in the first color conversion pattern 241 and may have a size of about 40 Å to 50 Å in the second color conversion pattern 242. The wavelength shift material 240p may emit light in various directions regardless of the incidence angle of incident light and may thus contribute to the improvement of the lateral visibility of the first and second colors displayed by the first and second pixels PXa and PXb. Light emitted from the first and second color conversion patterns 241 and 242 to a viewer's side (for example, an upward direction in FIG. 3) may be depolarized and may thus be in an unpolarized state. As used herein, the term "unpolarized light" denotes light that is not composed only of polarization components in a particular direction, i.e., light that is not polarized only in a particular direction. In other words, unpolarized light may be light consisting only of random polarization components. An example of unpolarized light is natural light. In some exemplary embodiments, the first color conversion pattern 241 and/or the second color conversion pattern 242 may further include light-scattering particles (not illustrated) dispersed in the base resin thereof.

The first and second color conversion patterns 241 and 242 may be spaced apart from each other over one of the light-shielding members 215. That is, the sides of the first and second color conversion patterns 241 and 242 may be spaced apart from each other. By physically isolating the first and second color conversion patterns 241 and 242 from each other, a defect in which light emitted by the wavelength shift material 240p in the first color conversion pattern 241 travels to the second color conversion pattern 242 and as a result, the first color is displayed in the second pixel PXb or vice versa can be inhibited.

A light-transmitting pattern layer 250 may be disposed on the second base substrate 210 in the third pixel PXc. The light-transmitting pattern layer 250 may transmit light therethrough without changing the color of the light. That is, the light transmitted through the light-transmitting pattern layer 250 may display the third color provided by the light source unit 20. The light-transmitting pattern layer 250 may have a light transmittance of about 90% or higher, about 95% or higher, or about 98% or higher.

The light-transmitting pattern layer 250 may be disposed in the third pixel PXc and may not overlap with the first wavelength band filters 220. The light-transmitting pattern layer 250 may include a base resin and light-scattering particles 250p dispersed in the base resin. The light-scattering particles 250p are not particularly limited as long as they are capable of scattering incident light, but may be, for example, particles of a metal oxide or particles of an organic material. Examples of the metal oxide include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$), and examples of the organic material include an acrylic resin and a urethane-based resin. The light-transmitting pattern layer 250, which includes the light-scattering particles 250p, can scatter light in various directions regardless of the incidence angle of the light without changing the wavelength of light of the third color, provided by the light source unit 20 and transmitted through the light-transmitting pattern layer 250. In this manner, the light-transmitting pattern layer 250 can contribute to the improvement of the lateral visibility of the third color displayed by the third pixel PXc of the LCD device 1. Light emitted from the light-transmitting pattern layer 250 to the viewer's side may be depolarized and may thus be in an unpolarized state. In another exemplary embodiment, the light-transmitting pattern layer 250 may be omitted.

The light-transmitting pattern layer 250 and the second color conversion pattern 242 may be spaced apart from each other over one of the light-shielding members 215. That is, the sides of the light-transmitting pattern layer 250 and the second color conversion pattern 242 may be spaced apart from each other. By physically isolating the light-transmitting pattern layer 250 and the second color conversion pattern 242 from each other, a defect in which light emitted by the wavelength shift material 240p in the second color conversion pattern 242 travels to the light-transmitting pattern layer 250 and as a result, the second color is displayed in the third pixel PXc can be inhibited.

The second wavelength band filter 260 may be disposed on the color conversion pattern layer 240 and the light-transmitting pattern layer 250. The second wavelength band filter 260 may be a selective optical filter allowing the transmission of light of a particular wavelength band while blocking the transmission of light of another particular wavelength band. For example, the second wavelength band filter 260 may be a color filter or a distributed Bragg reflector.

The second wavelength band filter 260 may be disposed in and throughout the first, second, and third pixels PXa, PXb, and PXc. The second wavelength band filter 260 may partially overlap with the first wavelength conversion filters 22. That is, the first and second wavelength conversion filters 220 and 260 may both be disposed in the first and second pixels PXa and PXb.

In one exemplary embodiment, the second wavelength band filter 260 may selectively transmit light of a wavelength band including the peak wavelength of the third color provided by the light source unit 20, and may selectively reflect having a longer peak wavelength than the peak wavelength of the third color. That is, the wavelength band of light that the first wavelength band filters 220 allow to be transmitted (for example, a wavelength band of about 510 nm to 560 nm and/or 600 nm to 650 nm) and the wavelength band of light that the second wavelength band filter 250 blocks from being transmitted (for example, a wavelength band of about 480 nm to 700 nm) may at least partially overlap with each other.

The second wavelength band filter 260 may reflect light emitted toward the second wavelength band filter 260, among other beams of light emitted in various directions by the wavelength shift material 240p of the color conversion pattern layer 240, toward the second base substrate 210, i.e., the viewer's side, and may thus contribute to the display of colors. In this manner, the light use efficiency of the LCD device 1 can be improved, and the LCD device 1 can display vivid colors. Also, the second wavelength band filter 260 may further improve the color purity of the light provided by the light source unit 20 by allowing the transmission of light having the peak wavelength of the third color and blocking the transmission of light having a longer peak wavelength than the peak wavelength of the third color, among other beams of light provided by the light source unit 20.

An overcoat layer 270 may be disposed on the second wavelength band filter 260. The overcoat layer 270 may be a planarization layer capable of minimizing height differences on a plurality of elements stacked on the second base substrate 210. The overcoat layer 260 may comprise an organic material.

A passivation layer 275 may be disposed on the overcoat layer 270. The passivation layer 275 may be formed of an insulating inorganic material such as silicon nitride or silicon oxide. The passivation layer 275 can prevent the overcoat layer 270 from being damaged in the process of forming a polarizing layer 280 that will be described later. In addition, the reliability of the LCD device 1 can be improved by improving the adhesion of the polarizing layer 280 and preventing the polarizing layer 280 from being damaged or corroded by penetration of air or moisture. In another exemplary embodiment, the passivation layer 275 may be omitted.

The polarizing layer 280 may be disposed on the passivation layer 275. The polarizing layer 280 performs an optical shutter function together with other polarizing elements (not illustrated) disposed between the liquid crystal layer 300 and the light source unit 20 to control the amount of transmitted light for each of the first, second, and third pixels PXa, PXb, and PXc. In one exemplary embodiment, the polarizing layer 280 may be a reflective polarizing element. The reflective polarizing element may impart a polarized state to light transmitted therethrough by selectively allowing the transmission of polarization components parallel to the transmission axis thereof and reflecting polarization components parallel to the blocking axis thereof.

The polarizing layer 280 may include linear lattice patterns disposed on the passivation layer 275. The linear lattice patterns may refer to a plurality of linear patterns extending in parallel to one another to be spaced apart from one another. The blocking axis of the polarizing layer 280 may be a direction substantially parallel to a direction in which the linear lattice patterns extend, and the transmission axis of the polarizing layer 280 may be a direction intersecting the direction in which the linear lattice patterns extend.

The linear lattice patterns of the polarizing layer 280 may be formed of a reflective metal material. Examples of the reflective metal material include aluminum (Al), silver (Ag), gold (Au), copper (Cu), titanium (Ti), molybdenum (Mo), nickel (Ni), and an alloy thereof. In some exemplary embodiments, the linear lattice patterns may be a stack of a plurality of linear lattice patterns formed of a metal material.

A capping layer 285 may be disposed on the polarizing layer 280. The capping layer 285 may be disposed directly on the polarizing layer 270 to cover and protect the linear lattice patterns of the polarizing layer 280. The capping layer 285 may prevent the linear lattice patterns of the polarizing layer 280 from being damaged or corroded by the infiltration of air or moisture and may planarize the linear lattice patterns of the polarizing layer 280. The capping layer 285 may be formed of an inorganic insulating material such as silicon nitride or silicon oxide.

The capping layer 290 may be disposed on the capping layer 285. The common electrode 290 may be integrally formed without regard to the distinctions between the first, second, and third pixels PXa, PXb, and PXc, and a common voltage may be applied to the common electrode 290. In one exemplary embodiment, the common electrode 290 may be disposed directly on the capping layer 285 and may be a transparent electrode.

The liquid crystal layer 300 will hereinafter be described. The liquid crystal layer 300 may include the liquid crystal 305, which are initially aligned. The liquid crystal 305 may have negative dielectric anisotropy and may be vertically aligned in their initial alignment state. In some exemplary embodiments, the liquid crystal 305 may have a predetermined pretilt angle in their initial alignment state. As used herein, the expression "the initial alignment of the liquid crystal 305" means the alignment of the liquid crystal 305 in the absence of an electric field in the liquid crystal layer 300.

The initial alignment of the liquid crystal 305 may be induced by first and second liquid crystal alignment layers 411 and 421. Once an electric field is formed between the pixel electrodes 190 and the common electrode 290, the liquid crystal 305 may be tilted in a particular direction so as to change the polarization state of light that passes through the liquid crystal layer 300. In another exemplary embodiment, the liquid crystal 305 may have positive dielectric anisotropy.

Figure 4:
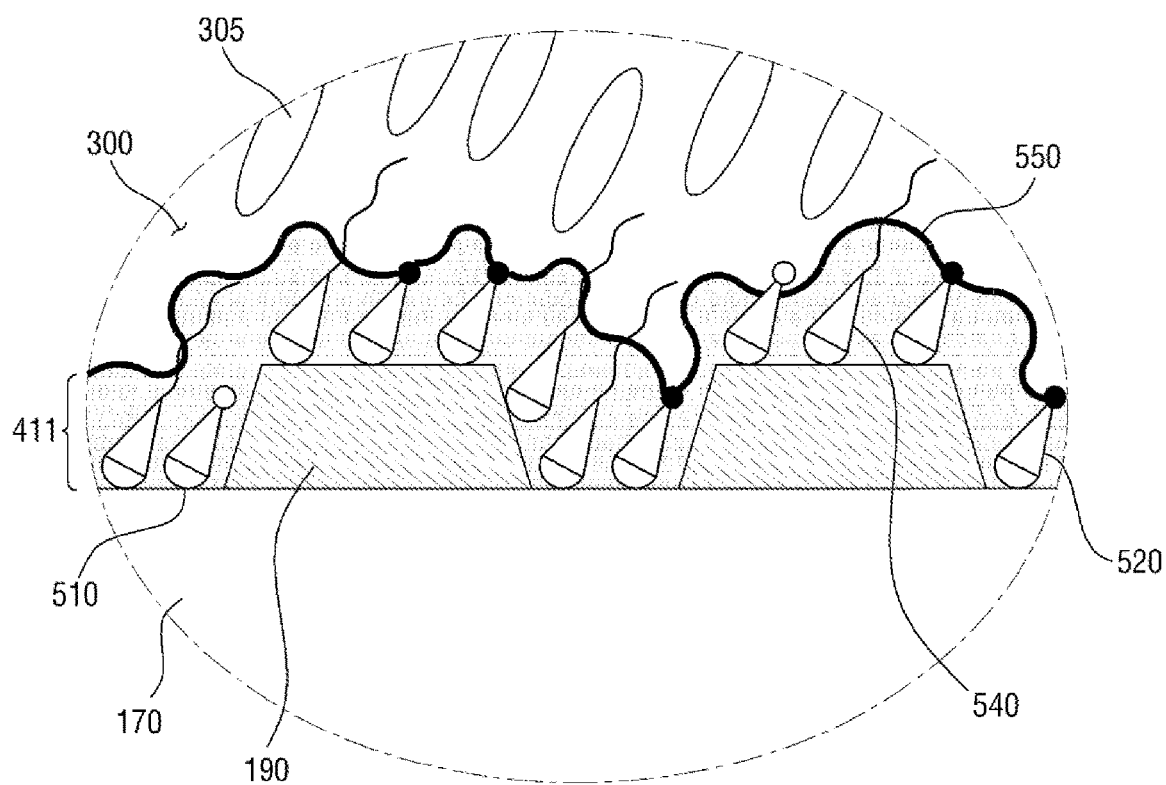
FIG. 4 is a partial enlarged cross-sectional view of a first liquid crystal alignment layer of FIG. 3.

The first and second liquid crystal alignment layers 411 and 421 will hereinafter be described with reference to FIG. 4. FIG. 4 is a partial enlarged cross-sectional view of a first liquid crystal alignment layer of FIG. 3.

Referring to FIGS. 1 through 4, the first liquid crystal alignment layer 411 may be disposed on the pixel electrodes 190. The first liquid crystal alignment layer 411 may induce the initial alignment of the liquid crystal 305 in part of the liquid crystal layer 300 adjacent thereto. The first liquid crystal alignment layer 411 may be placed in contact with the pixel electrodes 190, the intermediate layer 170, and the liquid crystal layer 300 at the same time.

The second liquid crystal alignment layer 421 may be disposed on the common electrode 290. The second liquid crystal alignment layer 421 may induce the initial alignment of the liquid crystal 305 in part of the liquid crystal layer 300 adjacent thereto. The second liquid crystal alignment layer 421 may be placed in contact with the common electrode 290 and the liquid crystal layer 300 at the same time.

For example, the first and second liquid crystal alignment layers 411 and 421 may be vertical alignment layers vertically aligning the liquid crystal 305. The first and second liquid crystal alignment layers 411 and 421 may impart a predetermined pretilt angle to the liquid crystal 305.

In one exemplary embodiment, at least one of the first and second liquid crystal alignment layers 411 and 421 may comprise a first compound 510, which has at least one hydrophilic group bonded to one end of the core structure thereof and a benzoyl derivative moiety bonded to the other end of the core structure thereof. The first compound 510 may be understood as being a compound that is not consumed by light irradiation in a method of manufacturing an LCD device that will be described later, but the present disclosure is not limited thereto.

The benzoyl derivative moiety, which is bonded to the other end of the core structure of the first compound 510, refers to a monovalent atomic group including a chemical structure derived from a benzoyl group. As used herein, the term "benzoyl derivative moiety" denotes a monovalent acid group derived from benzoic acid and may be expressed as "$C_6H_5CO$—*". The benzoyl derivative moiety may form free radicals when first compound 510 is exposed to light, particularly, for example, ultraviolet radiation.

For example, the benzoyl derivative moiety may be represented by one of Formulas Ia through Ie:

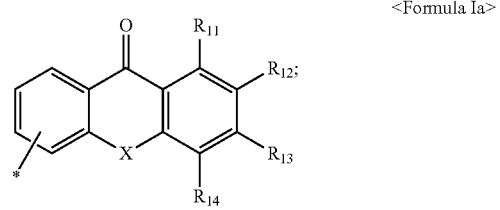

<Formula Ia>

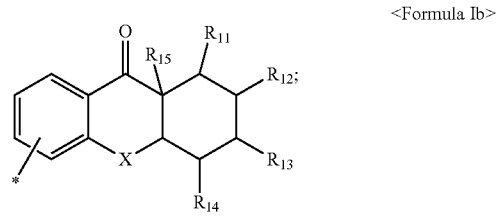

<Formula Ib>

-continued

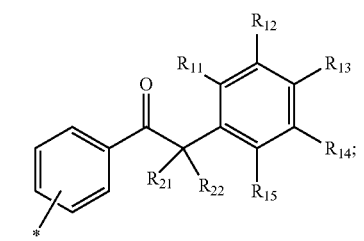
<Formula Ic>

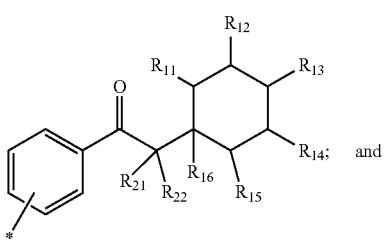
<Formula Id> and

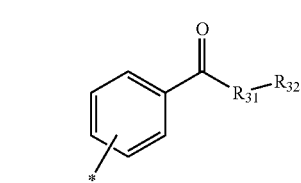
<Formula Ie> wherein $R_{11}$, $R_{12}$, $R_{13}$, $R_{14}$, $R_{15}$, and $R_{16}$ are each independently hydrogen, a hydroxyl group, a $C_{1-5}$ alkyl or alkoxy group, $R_{21}$ and $R_{22}$ are each independently hydrogen, a hydroxyl group, a $C_{1-5}$ alkyl group or a $C_{1-5}$ alkoxy or phenyl group, $R_{31}$ is a straight or branched $C_{1-5}$ alkylene group, $R_{32}$ is hydrogen or a hydroxyl group, and X is absent, or may be oxygen, sulfur, or a carbonyl group.

In a specific example, the benzoyl derivative moiety may be, but is not limited to, any one of the following atomic groups:

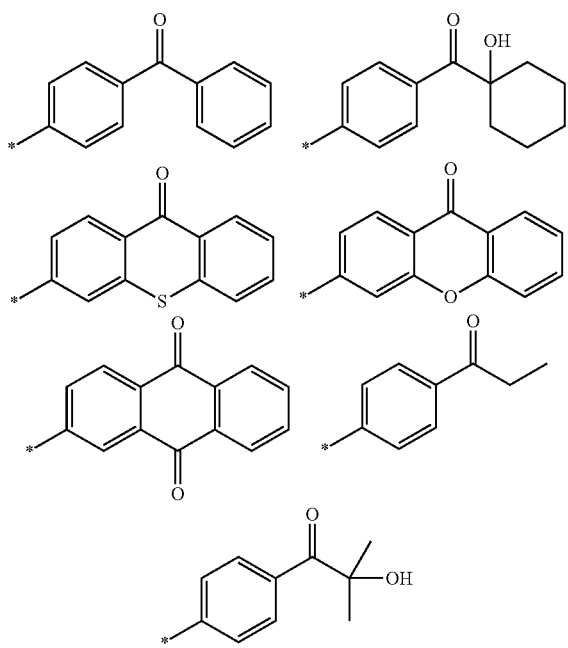

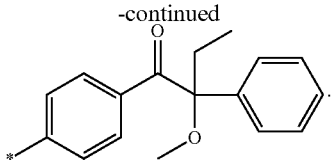

The core structure of the first compound 510 may include a mesogenic skeleton. The mesogenic skeleton of the first compound 510 may form the central skeleton of the first compound 510. The mesogenic skeleton of the first compound 510 may impart a predetermined liquid crystallinity to the first compound 510 and may thus facilitate mixing the first compound 510 with the liquid crystal 305. For example, the mesogenic skeleton of the first compound 510 may be a divalent atomic group represented by Formula II:

<Formula II>

$$*\!-\!SP1\!-\!L1\!-\!\!\left(\!A\!\right)\!-\!\!\left[L3\!-\!\!\left(\!B\!\right)\!\right]_n\!\!-\!L2\!-\!SP2\!-\!*.$$

Referring to Formula II, A and B are each independently a substituted or unsubstituted $C_{6-12}$ aliphatic or aromatic cyclic hydrocarbon group. Specifically, A and B may be mesogenic groups which impart a rigid property to the mesogenic skeleton of the first compound 510. For example, A and B are each independently 1,4-phenylene substituted or unsubstituted with —F, —Cl, —Br, —I, —CN, —NCO, —NCS, —OCN, —SCN, or —OH, naphthalene-2,6-diyl, 4,4'-biphenylene, 1,4-cyclohexylene, or 1,1'-bicyclohexylene. Referring again to Formula II, L1 and L2 are each independently a single bond, —O—, —S—, —CO—, —COO—, —OCO—, —OCOO—, $C_{1-4}$ alkylene, $C_{1-4}$ alkoxylene, —CH=CH=, or Referring again to Formula II, SP1 and SP2 may be spacer groups connected to both ends of the first compound 510. The spacer groups may be flexible organic groups connected to both ends of a mesogenic group having a relatively rigid property. For example, SP1 and SP2 may each independently be a single bond or a $C_{1-12}$ alkylene group.

Referring again to Formula II, n may define a repeating unit of the mesogenic skeleton of the first compound 510. Specifically, n is an integer of 1 to 3. Each B and each L3 in the repeating unit defined by n may be the same or may be different from each other.

The hydrophilic group of the first compound 510 may be a polar group having a chemical structure capable of hydrogen bonding. The hydrophilic group may impart a self-alignment characteristic to the first compound 510. For example, the hydrophilic group may align the first compound 510 by forming a hydrogen bond with a hydrophilic surface. The hydrophilic group is not particularly limited as long as it is capable of hydrogen bonding. For example, the hydrophilic group may be

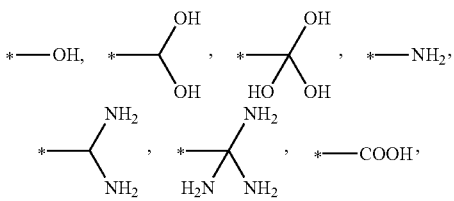

-continued

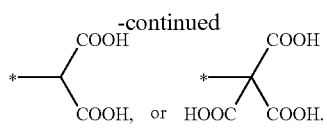

In one exemplary embodiment, the first compound 510 may be self-aligned within the first liquid crystal alignment layer 411 and/or the second liquid crystal alignment layer 421 to form a monomolecular layer. As used herein, the term "monolayer" denotes a molecular layer in the form of a thin film having a thickness of about one molecule.

For example, the hydrophilic group of the first compound 510 may be aligned in the first liquid crystal alignment layer 411 to be oriented toward the first substrate 100. The hydrophilic group of the first compound 510 may form a hydrogen bond with a functional group exposed on the surfaces of the pixel electrodes 190 and/or the intermediate layer 170, for example, a hydroxyl group, in the first liquid crystal alignment layer 411. Also, the hydrophilic group of the first compound 510 may be aligned in the second liquid crystal alignment layer 421 to be oriented toward the second substrate 200. The hydrophilic group of the first compound 510 may form a hydrogen bond with a functional group exposed on the surface of the common electrode 290 in the second liquid crystal alignment layer 421.

The long axis of the first compound 510 is aligned in a direction substantially perpendicular to the surface of the first substrate 100 (or the second substrate 200) so that the benzoyl derivative moiety of the first compound 510 may be oriented toward the liquid crystal layer 300. The long axis of the first compound 510 may contribute to the initial orientation of the liquid crystal 305 in the liquid crystal layer 300.

In some exemplary embodiments, at least one of the first and second liquid crystal alignment layers 411 and 421 comprises a polymer 550 of a second compound 520, which has at least one hydrophilic group bonded to one end of the core structure thereof and a polymerizable group bonded to the other end of the core structure thereof, or a polymer 550 of a third compound, which has polymerizable groups bonded to both ends of the core structure thereof.

The second compound 520 may have a core structure, at least one hydrophilic group bonded to one end of the core structure, and a polymerizable group bonded to the other end of a core structure.

The core structure of the second compound 520 may comprise a mesogenic skeleton. The mesogenic skeleton of the second compound 520 may form the central skeleton of the second compound 520. The mesogenic skeleton of the second compound 520 may impart a predetermined liquid crystallinity to the second compound 520 and may thus facilitate mixing the second compound 520 with the liquid crystal 305. The mesogenic skeleton of the second compound 520 is as already described above with reference to Formula II, and thus, a detailed description thereof will be omitted.

The hydrophilic group of the second compound 520 may be a polar group having a chemical structure capable of hydrogen bonding. The hydrophilic group of the second compound 520 may impart a self-alignment characteristic to the second compound 520. For example, the hydrophilic group of the second compound 520 may align the second compound 520 by forming a hydrogen bond with a hydrophilic surface. The hydrophilic group of the second compound 520 is as already described above in connection with the first compound 510, and thus, a detailed description thereof will be omitted.

The polymerizable group of the second compound 520 may impart polymerizability to the second compound 520 under particular conditions. For example, the polymerizable group of the second compound 520 may be a photopolymerizable group. Examples of the photopolymerizable group of the second compound 520 include an acryloyl group, a methacryloyl group, an acrylate group, and a methacrylate group.

In one exemplary embodiment, the second compound 520 may form a polymer 550 in the first liquid crystal alignment layer 411 and/or the second liquid crystal alignment layer 421. Specifically, a polymer 550 between the second compound 520 and another second compound 520 or between the second compound 520 and the third compound that will be described later may be formed by the polymerizable group of the second compound 520. The polymer 550 may be realized as protrusions and may generally cover the first liquid crystal alignment layer 411 and/or the second liquid crystal alignment layer 421, but the present disclosure is not limited thereto. The polymer 550 of the second compound 520 can contribute to the formation of the pretilt of the liquid crystal 305 in the liquid crystal layer 300.

The hydrophilic group of the second compound 520 may remain as it is even after the formation of the polymer 550, and may maintain a polarity capable of hydrogen bonding. For example, the hydrophilic group of the polymer 550 of the second compound 520 is aligned in the first liquid crystal alignment layer 411 to be oriented toward the first substrate 100, and the hydrophilic group of the polymer 550 of the second compound 520 may be aligned in the second liquid crystal alignment layer 421 to be oriented toward the second substrate 200.

The third compound may have a core structure and polymerizable groups bonded to both ends of the core structure.

The core structure of the third compound may comprise a mesogenic skeleton. The mesogenic skeleton of the third compound may form the central skeleton of the third compound. The mesogenic skeleton of the third compound may impart a predetermined liquid crystallinity to the third compound and may thus facilitate mixing the third compound with the liquid crystal 305. The mesogenic skeleton of the third compound is as already described above with reference to Formula II, and thus, a detailed description thereof will be omitted.

The polymerizable groups bonded to both ends of the core structure of the third compound may impart polymerizability to the third compound. For example, the polymerizable groups bonded to both ends of the core structure of the third compound may be photopolymerizable groups. Examples of the photopolymerizable groups bonded to both ends of the core structure of the third compound include acryloyl groups, methacryloyl groups, acrylate groups, and methacrylate groups. The polymerizable group of the second compound 520 may be the same as, or different from, the polymerizable groups of the third compound.

In one exemplary embodiment, the third compound may form a polymer 550 in the first liquid crystal alignment layer 411 and/or the second liquid crystal alignment layer 421. Specifically, a polymer 550 between the third compound and another third compound or between the third compound and the second compound 520 may be formed by the polymerizable groups bonded to both ends of the third compound. The polymer 550 may be realized as protrusions and may generally cover the first liquid crystal alignment layer 411 and/or the second liquid crystal alignment layer 421, but the present disclosure is not limited thereto. The polymer 550 of the third compound can contribute to the formation of the pretilt of the liquid crystal 305 in the liquid crystal layer 300.

In some exemplary embodiments, at least one of the first and second liquid crystal alignment layers 411 and 421 may further comprise a fourth compound 540, which has at least one hydrophilic group bonded to one end of the core structure thereof and an aliphatic or aromatic hydrocarbon moiety bonded to the other end of the core structure thereof.

The fourth compound 540 may have a core structure, at least one hydrophilic group bonded to one end of the core structure, and a hydrocarbon moiety bonded to the other end of the core structure.

The core structure of the fourth compound 540 may include a mesogenic skeleton. The mesogenic skeleton of the fourth compound 540 may form the central skeleton of the fourth compound 540. The mesogenic skeleton of the fourth compound 540 may impart a predetermined liquid crystallinity to the fourth compound 540 and may thus facilitate mixing the fourth compound 540 with the liquid crystal 305. The mesogenic skeleton of the fourth compound 540 is as already described above with reference to Formula II, and thus, a detailed description thereof will be omitted.

The hydrophilic group of the fourth compound 540 may be a polar group having a chemical structure capable of hydrogen bonding. The hydrophilic group of the fourth compound 540 may impart a self-alignment characteristic to the fourth compound 540. For example, the hydrophilic group of the fourth compound 540 may align the fourth compound 540 by forming a hydrogen bond with a hydrophilic surface. The hydrophilic group of the fourth compound 540 is as already described above in connection with the first compound 510, and thus, a detailed description thereof will be omitted.

The hydrocarbon moiety of the fourth compound 540 may be a vertical alignment group that induces a vertical alignment of the liquid crystal 305 with a strong affinity for the liquid crystal 305. That is, the hydrocarbon moiety of the fourth compound 540 may be a flexible liquid crystal group. The hydrocarbon moiety of the fourth compound 540 refers to a monovalent atomic group having a chemical structure derived from an aliphatic or aromatic hydrocarbon.

The hydrocarbon moiety of the fourth compound 540 may include a $C_{1-20}$ straight chain, branched or cyclic aliphatic hydrocarbon moiety or aromatic hydrocarbon moiety. For example, the hydrocarbon moiety of the fourth compound 540 may be a $C_{1-20}$ alkyl group, a $C_{1-20}$ alkoxy group, a $C_{1-20}$ cycloalkyl group, a $C_{1-20}$ aryl group, or a $C_{1-20}$ heteroaryl group, but the present disclosure is not limited thereto.

In one exemplary embodiment, the fourth compound 540 may be self-aligned in the first liquid crystal alignment layer 411 and/or the second liquid crystal alignment layer 421 to form monolayers.

For example, the hydrophilic group of the fourth compound 540 may be aligned in the first liquid crystal alignment layer 411 to be oriented toward the first substrate 10, and may be aligned in the second liquid crystal alignment layer 421 to be oriented toward the second substrate 200.

The long axis of the fourth compound 540 may be oriented toward a direction substantially perpendicular to the surface of the first substrate 100 (or the second substrate 200) so that the hydrocarbon moiety of the fourth compound 540 may be oriented toward the liquid crystal layer 300. The long axis of the fourth compound 540, particularly, the hydrocarbon moiety of the fourth compound 540, can contribute to the initial alignment of the liquid crystal 305 in the liquid crystal layer 300.

In some exemplary embodiments, the liquid crystal layer 300 may comprise at least one of the first compound 510, the second compound 520, the third compound, and the fourth compound 540. At least some of the first compound 510, the second compound 520, the third compound, and the fourth compound 540 may not form the first and second liquid crystal alignment layers 411 and 421 and may still remain in the liquid crystal layer 300, but the present disclosure is not limited thereto.

The LCD device 1 can vertically align the liquid crystal 305 using the first and second liquid crystal alignment layers 411 and 412 and can thus form the pretilt angle of the liquid crystal 305. Accordingly, the display quality of the LCD device 1 can be enhanced, and the response speed of the LCD device 1 can be improved.

In addition, since a polymerization reaction can be enabled using free radicals generated by the benzoyl derivative moiety of the first compound 510, without the need to add an additional initiator to a liquid crystal composition, the content of impurities (for example, an initiator compound) that remain in the liquid crystal layer 300 can be minimized, and the voltage holding ratio of the liquid crystal display device 1 can be improved.

LCD devices according to other exemplary embodiments of the present disclosure will hereinafter be described. Descriptions of elements that are substantially the same as their respective counterparts of the LCD device 1 will be omitted, but will be clearly understood by a person skilled in the art from the accompanying drawings. In the drawings, like reference numerals indicate like elements.

Figure 5:
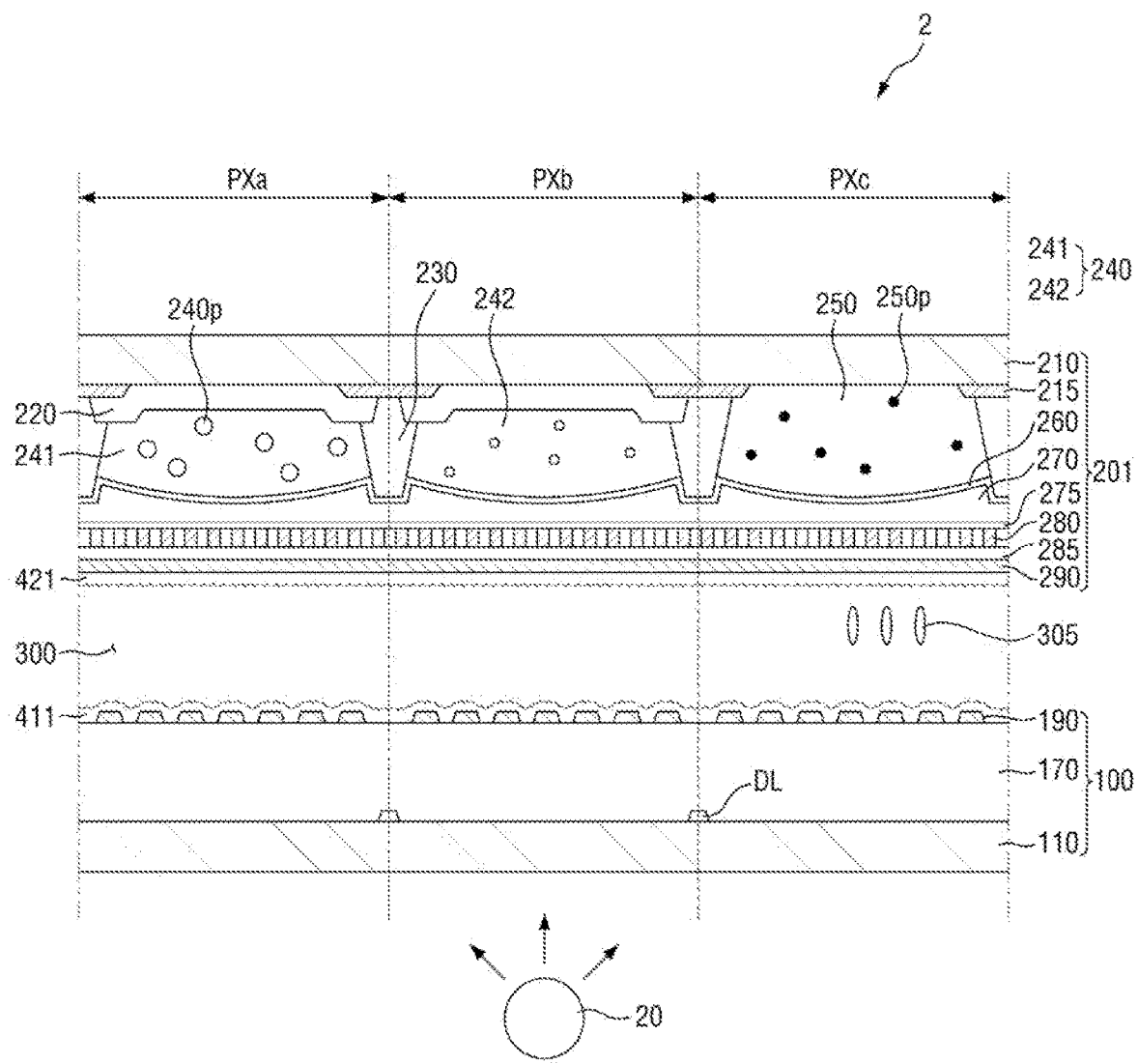
FIG. 5 is a cross-sectional view of an LCD device according to another exemplary embodiment of the present disclosure.

FIG. 5 is a cross-sectional view of an LCD device according to another exemplary embodiment of the present disclosure.

Referring to FIG. 5, an LCD device 2 differs from the LCD device 1 of FIG. 3 in that a second substrate 201 thereof further includes partition walls 230, which separate a plurality of pixels (PXa, PXb, and PXc).

Light-shielding members 215 may be disposed on the second base substrate 210. The light-shielding members 215 may be substantially in a lattice shape. First wavelength band filters 220 may be disposed on the light-shielding members 215.

In one exemplary embodiment, the partition walls 230 may be disposed on the light-shielding members 215. The partition walls 230 may be substantially in a lattice shape, and due to the partition walls 230 substantially having a lattice shape, openings, which at least partially expose the surface of the second base substrate 210, may be defined. That is, the partition walls 230 may be disposed to form the openings. The partition walls 230 may be formed of a light-transmitting material, a light-absorbing material, or a light-reflecting material.

In a case where a color conversion pattern layer 240 and/or a light-transmitting pattern layer 250 are formed by inkjet printing, the partition walls 230 may help the ejection and alignment of an ink composition. That is, the partition walls 230 may serve as guides for precisely ejecting, and stably placing, an ink composition for forming the color conversion pattern layer 240 and the light-transmitting pattern layer 250. In order to form a color conversion pattern layer 240 having a sufficient thickness, the height of the partition walls 230 may have a lower limit of about 7.0 μm, about 7.5 μm, about 8.0 μm, about 8.5 μm, about 9.0 μm, about 9.5 μm, about 10.0 μm, about 10.5 μm, about 11.0 μm, about 11.5 µm, about 12.0 µm, or about 15.0 µm. By forming the partition walls 230 to have a height of at least 7.0 µm, a color conversion pattern layer 240 having a sufficient thickness can be formed. Accordingly, the color conversion pattern layer 240 can provide an improved color conversion efficiency.

A first color conversion pattern 241 may be disposed in an opening formed in a first pixel PXa by the partition walls 230, and a second color conversion pattern 242 may be disposed in an opening formed in a second pixel PXb by the partition walls 230. The light-transmitting pattern layer 250 may be disposed in an opening formed in a third pixel PXc by the partition walls 230. The color conversion pattern layer 240, including the first and second color conversion patterns 241 and 242, and the light-transmitting pattern layer 250 are as already described above with reference to FIG. 3, and thus, detailed descriptions thereof will be omitted.

A second wavelength band filter 260, an overcoat layer 270, a passivation layer 275, a polarizing layer 280, a capping layer 285, and a common electrode 290 may be disposed on the color conversion pattern layer 240 and the light-transmitting pattern layer 250.

Figure 6:
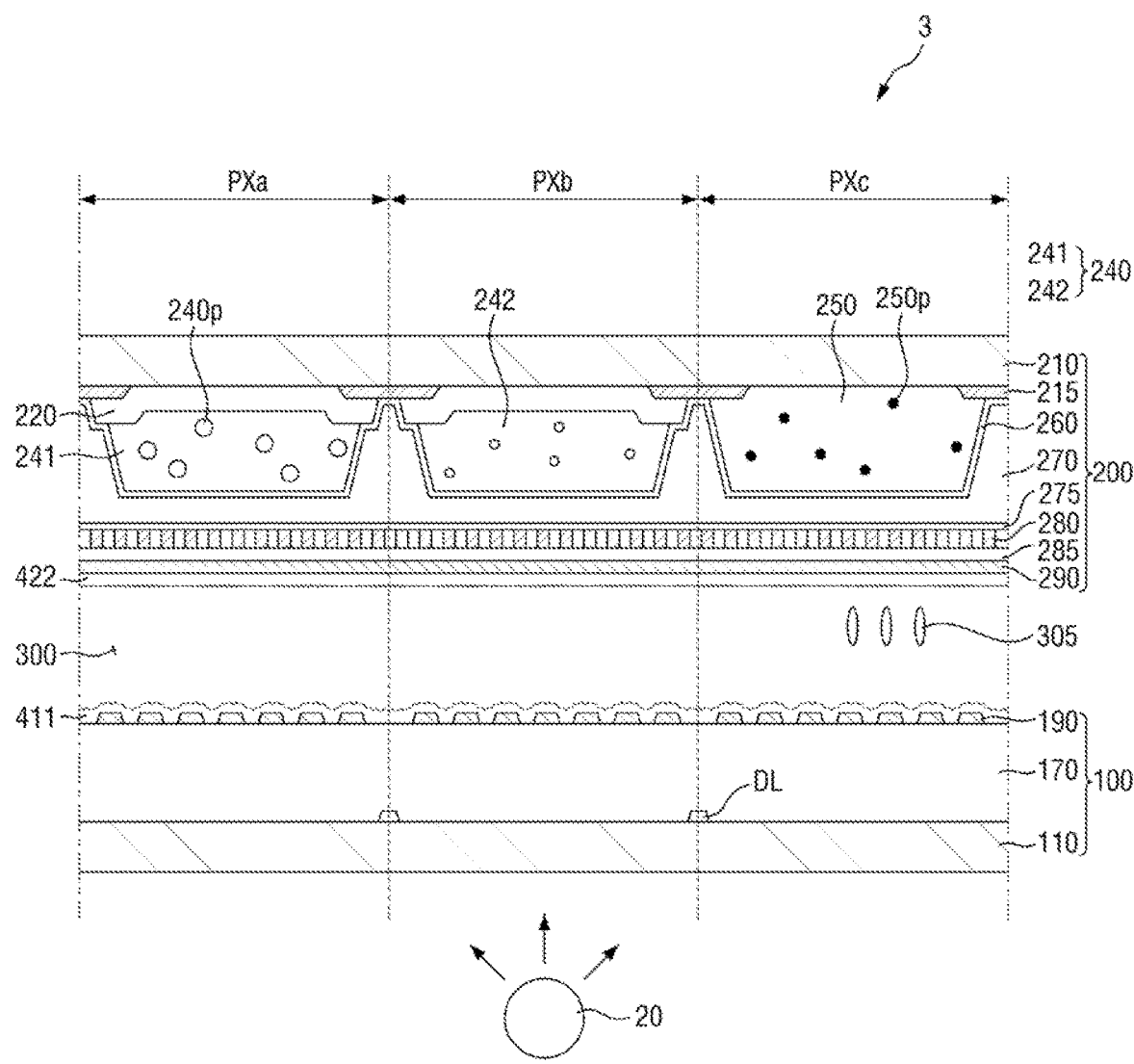
FIG. 6 is a cross-sectional view of an LCD device according to another exemplary embodiment of the present disclosure.
Figure 7:
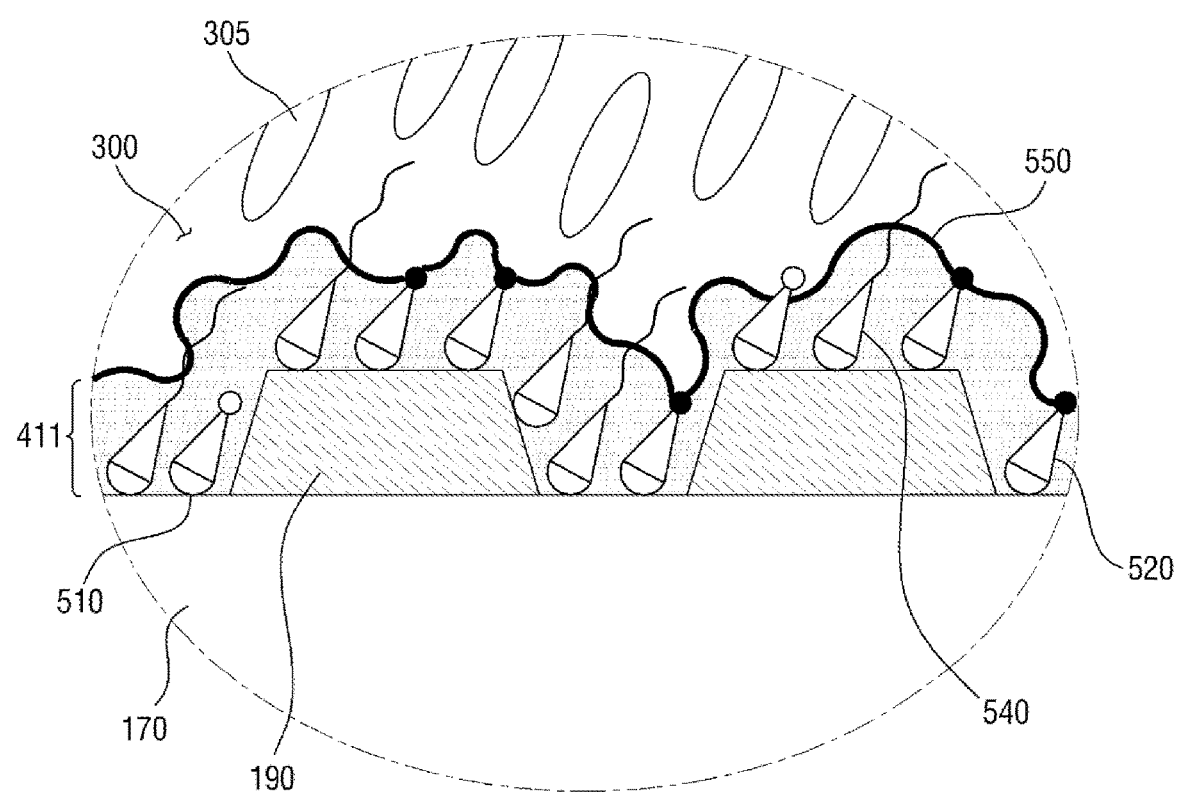
FIG. 7 is a partial enlarged cross-sectional view of a first liquid crystal alignment layer of FIG. 6.
Figure 8:
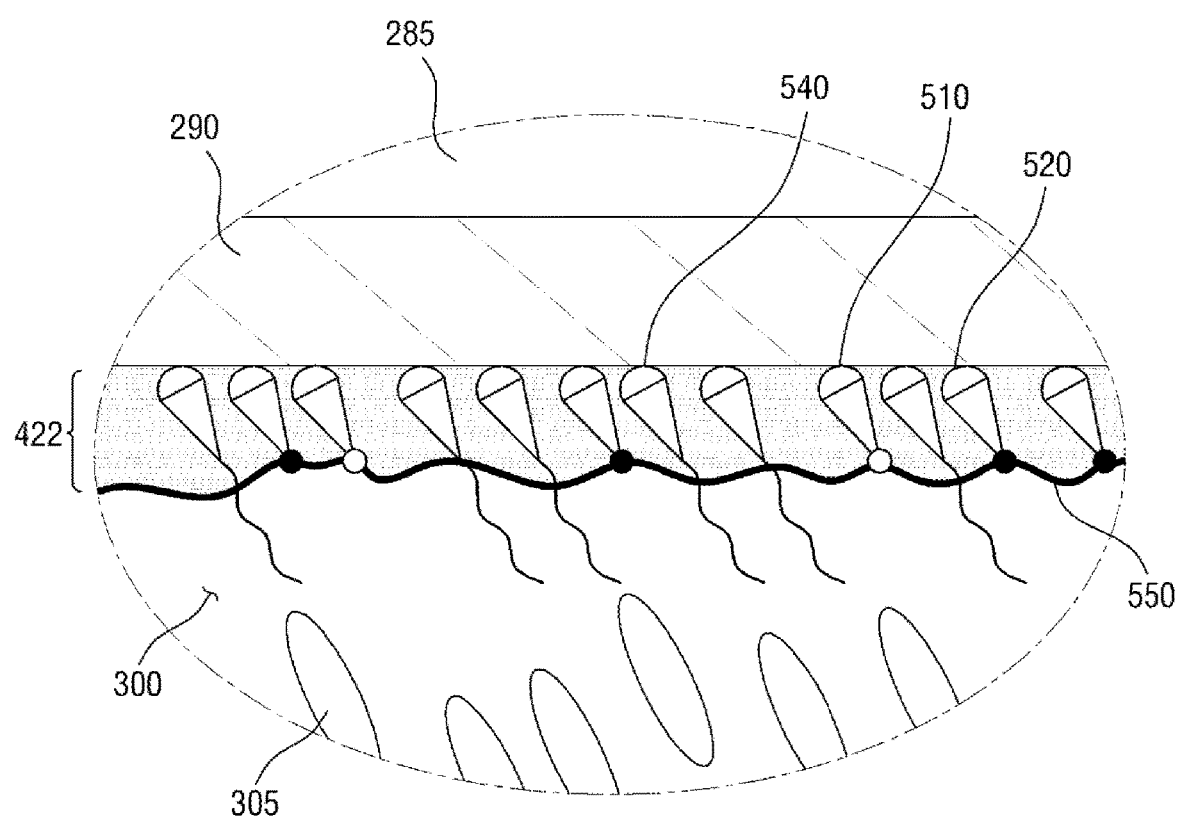
FIG. 8 is a partial enlarged cross-sectional view of a second liquid crystal alignment layer of FIG. 6.

FIG. 6 is a cross-sectional view of an LCD device according to another exemplary embodiment of the present disclosure. FIG. 7 is a partial enlarged cross-sectional view of a first liquid crystal alignment layer of FIG. 6. FIG. 8 is a partial enlarged cross-sectional view of a second liquid crystal alignment layer of FIG. 6.

Referring to FIGS. 6 through 8, an LCD device 3 differs from the LCD device 1 of FIG. 3 in that first and second liquid crystal alignment layers 411 and 422 thereof have different surface roughnesses.

In one exemplary embodiment, the surface roughness of a surface (for example, the top surface in FIG. 6) of the first liquid crystal alignment layer 411 that contacts a liquid crystal layer 300 may be greater than the surface roughness of a surface (for example, the bottom surface in FIG. 6) of the second liquid crystal alignment layer 422 that faces the liquid crystal layer 300.

A polymer 550 of a second compound 520 and/or a third compound may be realized as fine protrusions. The amount of the polymer 550 per unit area of the first liquid crystal alignment layer 411 may be greater than the amount of the polymer 550 per unit area of the second liquid crystal alignment layer 422. That is, the polymerization degree, the content per unit area, and/or the absolute amount of the polymer 550 may be greater in the first liquid crystal alignment layer 411 than in the second liquid crystal alignment layer 422.

This may be due to differences in the amounts of the second compound 520 and the third compound in polymerized monolayers and/or the amount of a first compound 510 having a benzoyl derivative moiety. In a non-limiting example, as will be described later in connection with a method of manufacturing an LCD device according to an exemplary embodiment of the present disclosure, the degree to which the first compound 510, the second compound 520, the third compound, and a fourth compound 540 are self-aligned on the surface of a first substrate 100 may be greater than the degree to which the first compound 510, the second compound 520, the third compound, and the fourth compound 540 are self-aligned on the surface of a second substrate 200. The degree of the self-alignment of the first compound 510, the second compound 520, the third compound, and the fourth compound 540 may be controlled by the difference between the degree of hydrophilicity of the surface of the first substrate 100 and the degree of hydrophilicity of the surface of the second substrate 200.

For example, the hydrophilicity of the surface of the first substrate 100 may be greater than the hydrophilicity of the surface of the second substrate 200. Accordingly, the amount by which the first compound 510, the second compound 520, the third compound, and the fourth compound 540 are self-aligned by forming hydrogen bonds with the surface of the first substrate 100 may be greater than the amount by which the first compound 510, the second compound 520, the third compound, and the fourth compound 540 are self-aligned by forming hydrogen bonds with the surface of the second substrate 200.

During the manufacture of the LCD device 3, the amount by which the first compound 510 is self-aligned on the surface of the first substrate 100 may be greater than the amount by which the first compound 510 is self-aligned on the surface of the second substrate 200. Since as already described above, the amount of the first compound 510, which promotes a polymerization reaction, is greater on the surface of the first substrate 100 than on the surface of the second substrate 200, the first liquid crystal alignment layer 411 may include a monolayer that is more polymerized than a monolayer included in the second liquid crystal alignment layer 422.

As already described above, a polymer 550 between the second compound 520 and another second compound 520, between the third compound and another third compound, or between the second compound 520 and the third compound can contribute to the formation of the pretilt of liquid crystal 305 in the liquid crystal layer 300. Accordingly, the pretilt of the liquid crystal 305 in the liquid crystal layer 300 may be greater near the first liquid crystal alignment layer 411, which contains a relatively large amount of polymers, (i.e., in a lower portion of the liquid crystal layer 300) than near the second liquid crystal alignment layer 422, which contains a relatively small amount of polymers (i.e., in an upper portion of the liquid crystal layer 300).

Although not specifically illustrated, the LCD device 3 may be a curved LCD device. For example, the LCD device 3 may be curved in such a manner that a surface (for example, the top surface in FIG. 6) of the first substrate 100 that faces the second substrate 200 may have a concave curved surface, and that a surface (for example, the bottom surface in FIG. 6) of the second substrate 200 that faces the first substrate 200 may have a convex curved surface.

The LCD device 3 can form the pretilt of the liquid crystal 305 differently from the top to the bottom of the liquid crystal layer 300. Accordingly, it is possible to improve or reduce any stains or dark parts that may be caused in a curved LCD display device due to collisions between the alignment directions of liquid crystal.

A method of manufacturing an LCD device according to an exemplary embodiment of the present disclosure will hereinafter be described.

Figure 9:
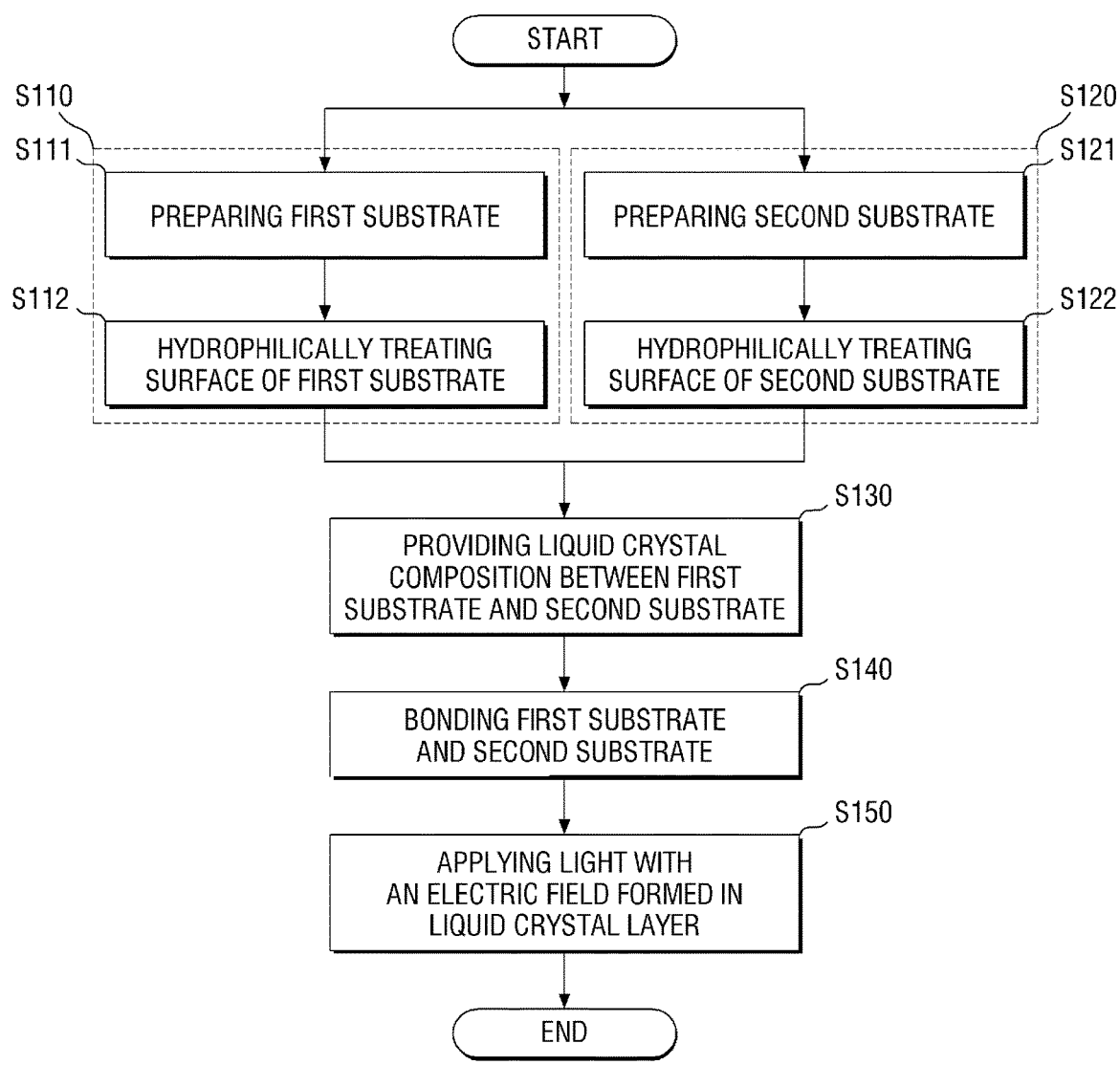
FIG. 9 is a flowchart illustrating a method of manufacturing an LCD device according to an exemplary embodiment of the present disclosure.
Figure 10:
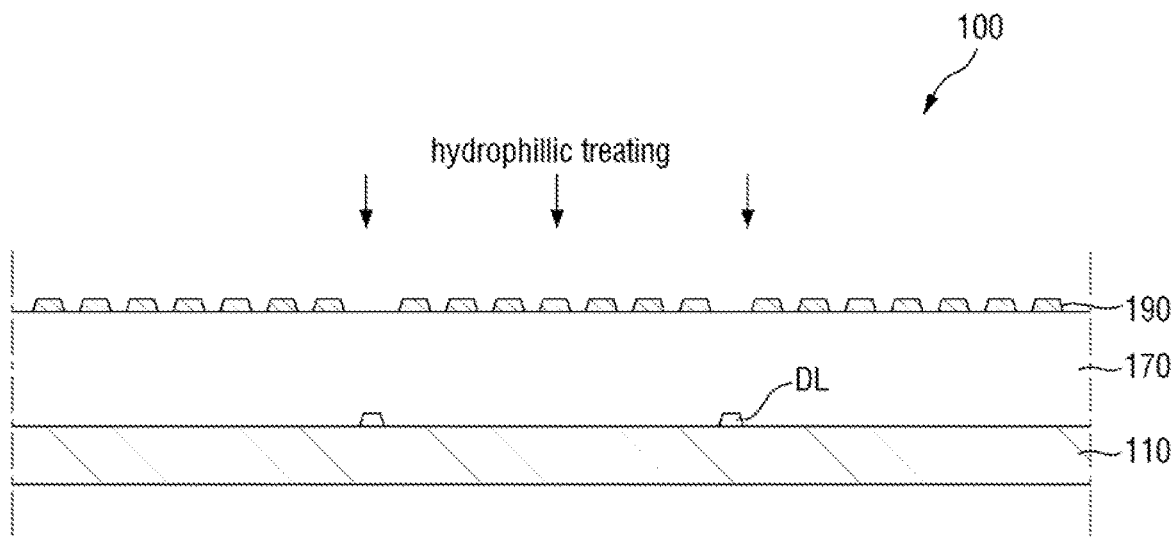
FIGS. 10 through 16 are cross-sectional views illustrating the method of FIG. 9.
Figure 11:
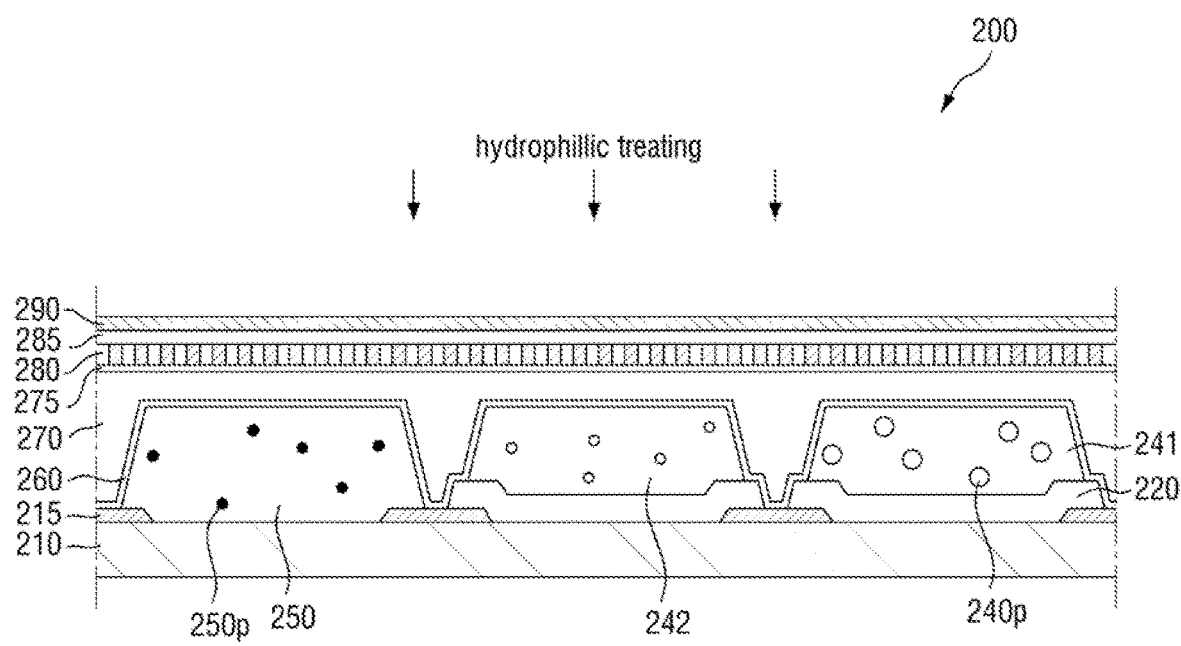
Figure 12:
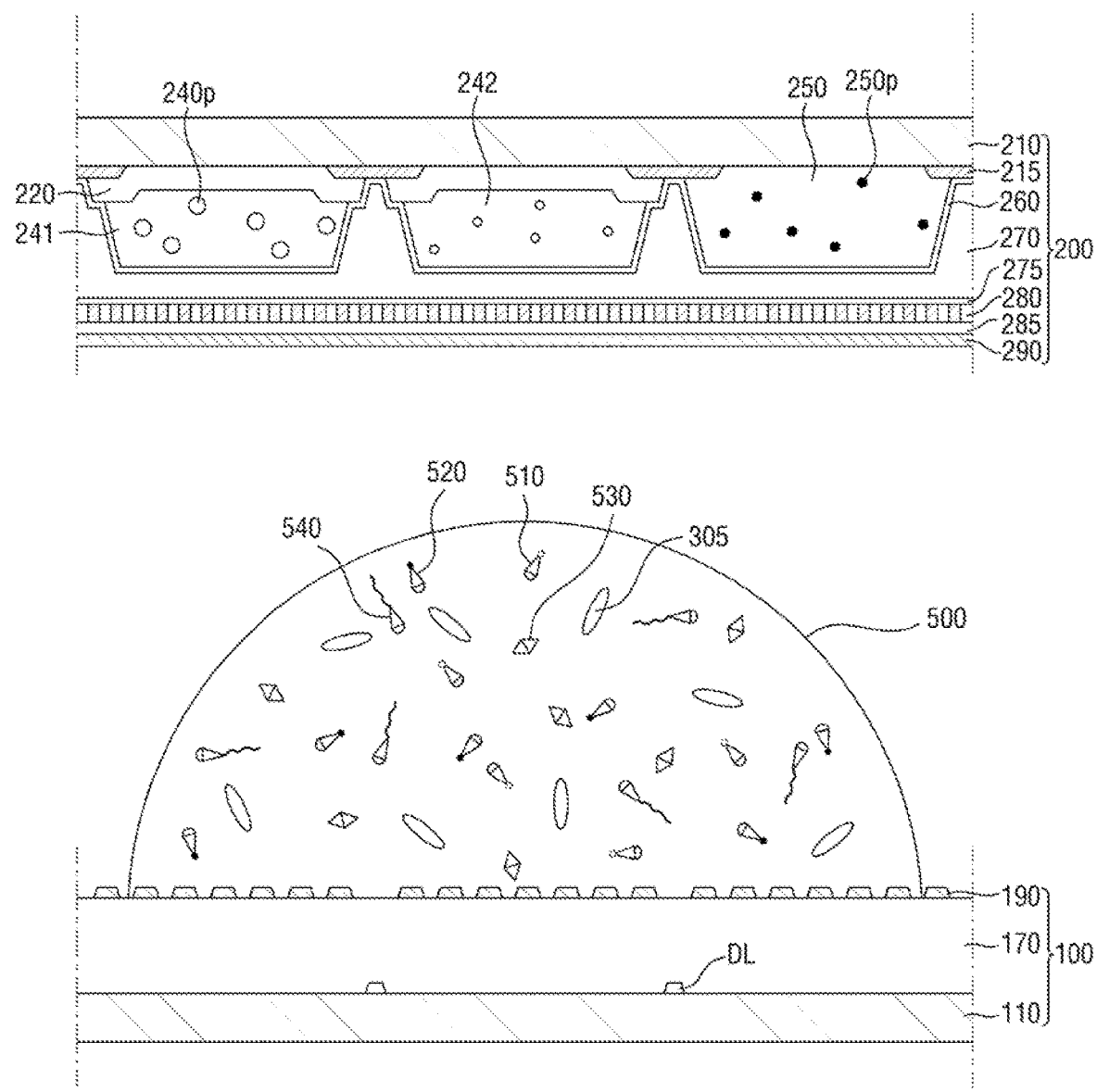
Figure 13:
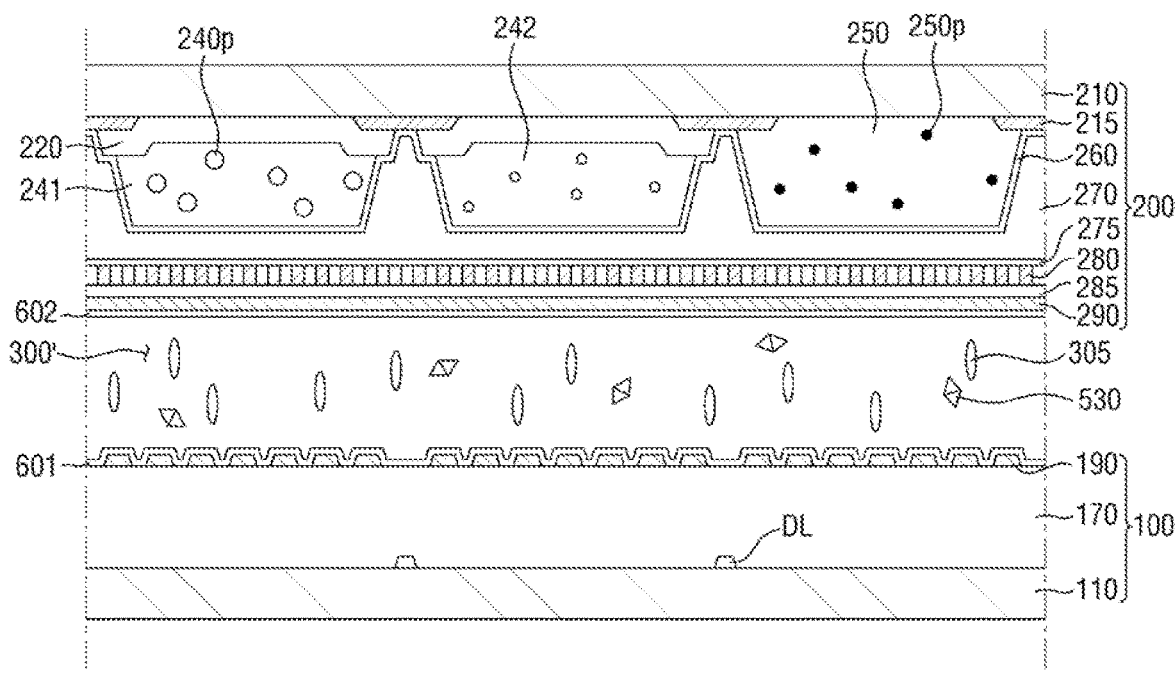
Figure 14:
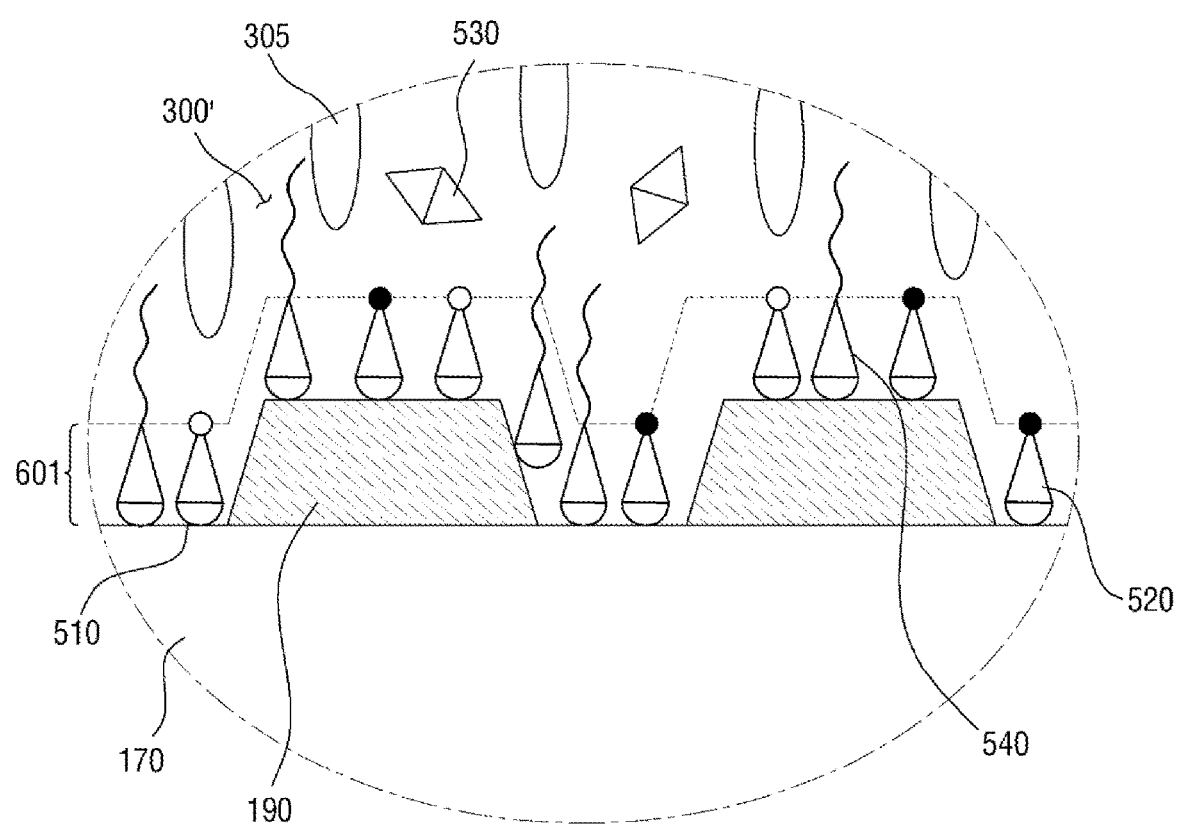
Figure 15:
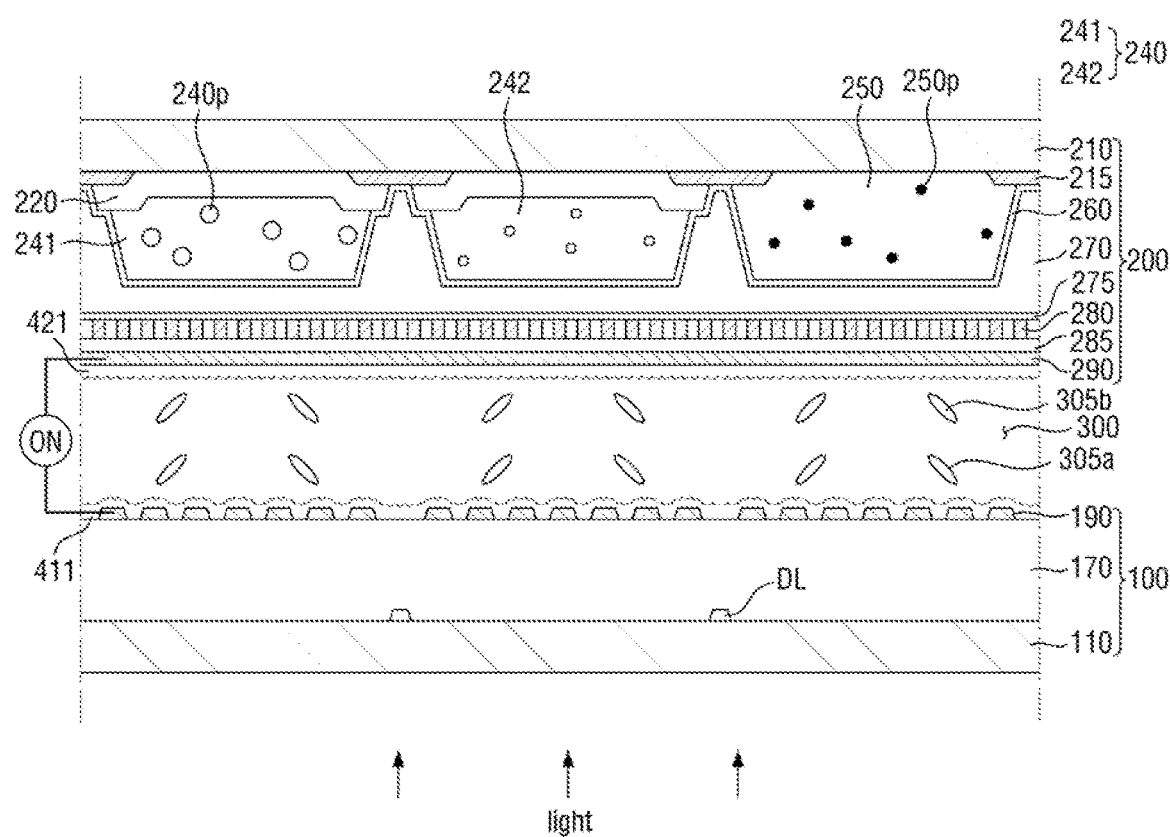
Figure 16:
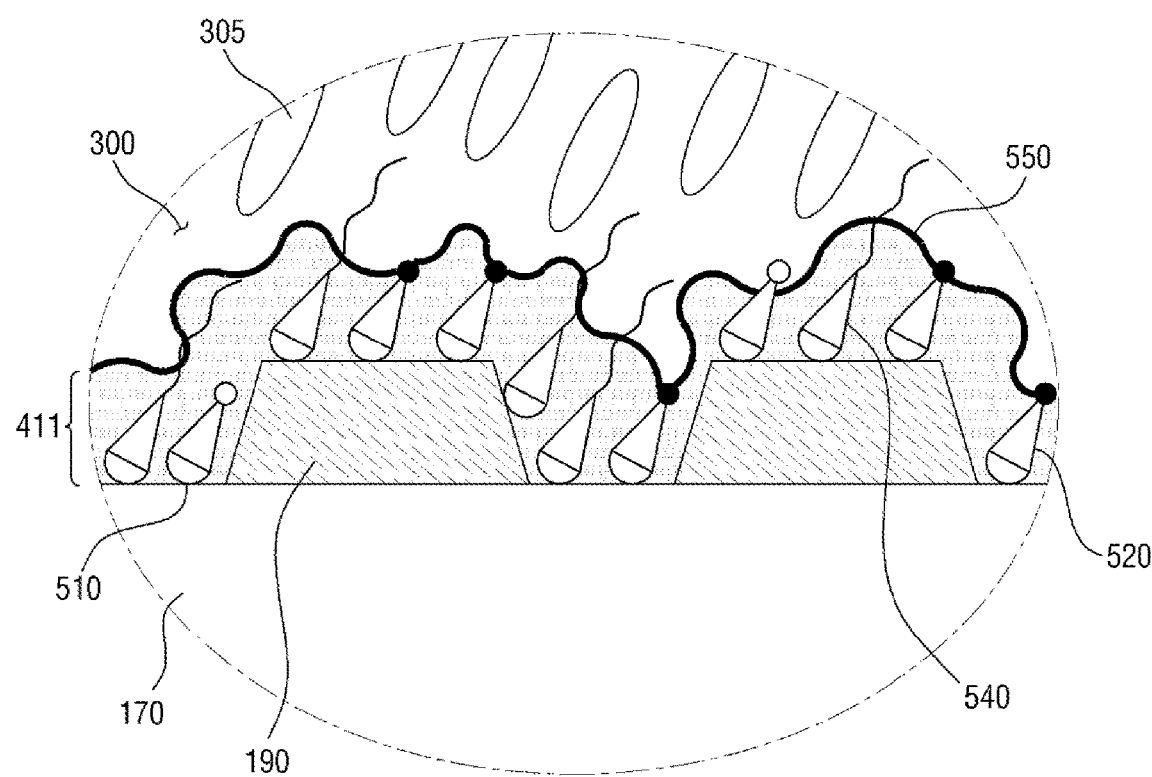

FIG. 9 is a flowchart illustrating a method of manufacturing an LCD device according to an exemplary embodiment of the present disclosure. FIGS. 10 through 16 are cross-sectional views illustrating the method of FIG. 9. Specifically, FIG. 10 is a cross-sectional view illustrating the step of preparing a first substrate 100 whose surface is hydrophilically treated (S110), FIG. 11 is a cross-sectional view illustrating the step of preparing a second substrate 100 whose surface is hydrophilically treated (S120), FIG. 12 is a cross-sectional view illustrating the step of providing a liquid crystal composition 500 (S130), FIG. 13 is a cross-sectional view illustrating the step of forming a liquid crystal layer 300' (S140), FIG. 14 is an enlarged cross-sectional view of a first alignment layer 601 of FIG. 13, FIG. 15 is a cross-sectional view illustrating the step of applying light with an electric field formed in a liquid crystal layer 300, and FIG. 16 is an enlarged cross-sectional view of a first liquid crystal alignment layer 411 of FIG. 15.

Referring to FIGS. 9 and 10, a first substrate 100 whose surface is hydrophilically treated is prepared (S110). Specifically, a first substrate 100 including a first base substrate 110, switching elements (not illustrated), an intermediate layer 170, and pixel electrodes 190 is prepared (S111), and the surface of the first substrate 100 is hydrophilically treated (S112).

The intermediate layer 170 and/or the pixel electrodes 190, which are formed of an organic material or an inorganic material, may be at least partially exposed on the surface of the first substrate 100. The elements of the first substrate 100 are as already described above with reference to FIG. 3, and thus, detailed descriptions thereof will be omitted.

The step of hydrophilically treating the surface of the first substrate 100 (S112) may include at least one of the steps of ozone-treating the surface of the first substrate 100, plasma-treating the surface of the first substrate 100, and ultraviolet (UV)-treating the surface of the first substrate 100. As a result of the step of hydrophilically treating the surface of the first substrate 100 (S112), the hydrophilicity of the surfaces of the intermediate layer 170 and the pixel electrodes 190 on the first substrate 100 can be controlled. For example, the hydrophilicity of the surface of the first substrate 100 can be improved. In this manner, the self-alignment characteristic of first through fourth compounds of a liquid crystal composition at the surface of the first substrate 100 can be maximized. In one exemplary embodiment, the step of hydrophilically treating the surface of the first substrate 100 (S112) may be the step of performing hydrophilic treatment on the surface of the first substrate 100 so as for the surface of the first substrate 100 to have a contact angle of about 70° or less with respect to distilled water. If the surface of the first substrate 100 has a contact angle of 70° or greater with respect to distilled water, sufficient self-alignment characteristic may not be imparted to the first through fourth compounds, and the alignment performance of liquid crystal may be insufficient. Also, the contents [do you mean "concentrations"?] of the first through fourth compounds that remain dispersed in a liquid crystal layer without being self-aligned increase, and as a result, the voltage holding ratio of an LCD device may decrease.

Thereafter, referring to FIGS. 9 through 11, a second substrate 200 whose surface is hydrophilically treated is prepared (S120). Specifically, a second substrate 200 including a second base substrate 210, first wavelength band filters 220, a color conversion pattern layer 240, a second wavelength conversion filter 260, and a common electrode 290 is prepared (S121), and the surface of the second substrate 200 is hydrophilically treated (S122). The common electrode 290 is at least partially exposed on the surface of the second substrate 200. The elements of the second substrate 200 are as already described above with reference to FIG. 3, and thus, detailed descriptions thereof will be omitted.

The process of hydrophilically treating the surface of the second substrate 200 (S122) may include at least one of the steps of ozone-treating the surface of the second substrate 200, plasma-treating the surface of the second substrate 200, and UV-treating the surface of the second substrate 200. As a result of the step of hydrophilically treating the surface of the second substrate 200 (S122), the hydrophilicity of the surface of the common electrode 290 on the second substrate 200 can be controlled. In this manner, the self-alignment characteristic of the first through fourth compounds of the liquid crystal composition at the surface of the second substrate 200 can be maximized. In one exemplary embodiment, the step of hydrophilically treating the surface of the second substrate 200 (S122) may be the step of performing hydrophilic treatment on the surface of the second substrate 200 so as for the surface of the second substrate 200 to have a contact angle of about 70° or less with respect to distilled water.

In some exemplary embodiments, the degree to which the surface of the first substrate 100 is hydrophilically treated may differ from the degree to which the surface of the second substrate 200 is hydrophilically treated. For example, the degree to which the surface of the first substrate 100 is hydrophilically treated may be greater than the degree to which the surface of the second substrate 200 is hydrophilically treated. In another exemplary embodiment, at least one of the step of hydrophilically treating the surface of the first substrate 100 (S122) and the step of hydrophilically treating the surface of the second substrate 200 (S122) may be omitted.

Thereafter, referring to FIGS. 9 through 12, a liquid crystal composition 500 may be provided between the first and second substrates 200 (S130). In one exemplary embodiment, the liquid crystal composition 500 may comprise a first compound 510, which has at least one hydrophilic group bonded to one end of the core structure thereof and a benzoyl derivative moiety bonded to the other end of the core structure thereof. In some exemplary embodiments, the liquid crystal composition 500 may further comprise at least one of a second compound 520, which has at least one hydrophilic group bonded to one end of the core structure thereof and a polymerizable group bonded to the other end of the core structure thereof, a third compound 530, which has polymerizable groups bonded to both ends of the core structure thereof, and a fourth compound 540, which has at least one hydrophilic group bonded to one end of the core structure thereof and an aliphatic or aromatic hydrocarbon moiety bonded to the other end of the core structure thereof.

As already described above, each of the first, second, third, and fourth compounds 510, 520, 530, and 540 has a mesogenic skeleton as a core structure and has a predetermined liquid crystallinity. Accordingly, the first, second, third, and fourth compounds 510, 520, 530, and 540 become sufficiently mixable with liquid crystal 305 and can be uniformly dispersed in the liquid crystal composition 500 so as to inhibit the occurrence of phase separation. The first, second, third, and fourth compounds 510, 520, 530, and 540 are as already described above with reference to FIG. 3, and thus, detailed descriptions thereof will be omitted.

In some exemplary embodiments, the first compound 510 may be contained in an amount of about 0.1 wt % to about 30.0 wt % based on the sum of the weights of the first, second, third, and fourth compounds 510, 520, 530, and 540. If the first compound 510 is contained in an amount of 0.1 wt % or more, a sufficient amount of free radicals can be formed by the benzoyl derivative moiety of the first compound 510, even with a relatively small amount of light, and as a result, a polymerization reaction can be promoted. However, if the first compound 510 is contained in an amount of more than 30.0 wt %, the first compound 510 may not be able to be hydrogen-bonded to the surfaces of the first and second substrates 100 and 200. As a result, the first compound 510 may serve as impurities in the liquid crystal layer 300 and may lower the voltage holding ratio of an LCD device.

The third compound 530 may be contained in an amount of about 0.1 wt % to about 0.8 wt % based on the total weight of the liquid crystal composition 500. If the third compound 530, which has polymerizable groups bonded to both ends thereof and thus has a high reactivity, is contained in an amount of about 0.1 wt % to about 0.8 wt % based on the total weight of the liquid crystal composition 500, a polymer of the third compound 530 can be properly formed, and a predetermined pretilt of the liquid crystal 305 can be formed without lowering the light transmittance of an LCD device.

In one exemplary embodiment, the step of providing the liquid crystal composition 500 (S130) may be the step of providing the liquid crystal composition 500 so as for the liquid crystal composition 500 to be placed in contact with parts of the pixel electrodes 190 and the intermediate layer 170 exposed on the surface of the first substrate 100. FIG. 12 illustrates a process of dropping the liquid crystal composition 500 onto the surface of the first substrate 100, but alternatively, the liquid crystal composition 500 may be dropped onto the surface of the second substrate 200, in which case, the liquid crystal composition 500 may be placed in contact with part of the common electrode 290 exposed on the surface of the second substrate 200.

Thereafter, referring to FIGS. 9 through 13, a liquid crystal layer 300' is formed by bonding the first and second substrates 100 and 200 (S140).

The first and second substrates 100 and 200 may be bonded by a sealing member (not illustrated), for example, a sealant. The liquid crystal layer 300' may be surrounded by the first and second substrates 100 and 200 and the sealing member.

In one exemplary embodiment, after the formation of the liquid crystal layer 300' between the first and second substrates 100 and 200, phase separation may occur between the first, second, third, and fourth compounds 510, 520, 530, and 540 and the liquid crystal 305 in the liquid crystal layer 300'. For example, at least some of the first, second, third, and fourth compounds 510, 520, 530, and 540 may be aligned on the surface of the first substrate 100 and may thus form a first alignment layer 601, and at least some of the first, second, third, and fourth compounds 510, 520, 530, and 540 may be aligned on the surface of the second substrate 200 and may thus form a second alignment layer 602. In the step of forming the liquid crystal layer 300' (S140), the first, second, third, and fourth compounds 510, 520, 530, and 540 may all be monomolecular compounds.

FIGS. 12 and 13 illustrate an example in which the liquid crystal layer 300' is formed by dropping the liquid crystal composition 500 onto the surface of the first substrate 100 and then bonding the first and second substrates 100 and 200, but in another example, the liquid crystal layer 300' may be formed by bonding the first and second substrates 100 and 200 and then injecting the liquid crystal composition 500.

The first and second alignment layers 601 and 602, which are formed in the step of forming the liquid crystal layer 300' (S140), will hereinafter be described with reference to FIG. 14.

Referring to FIGS. 9 through 14, the first, second, and fourth compounds 510, 520, and 540 may be self-aligned on the surface of the first substrate 100 and/or the surface of the second substrate 200 so as to form monolayers (i.e., the first and second alignment layers 601 and 602). The long axes of the first, second, and fourth compounds 510, 520, and 540 may be aligned in a direction substantially perpendicular to the surface of the first substrate 100 (or the second substrate 200).

For example, the hydrophilic groups of the first, second, and fourth compounds 510, 520, and 540 may be aligned in the first alignment layer 601 to be oriented toward the first substrate 100, and the benzoyl derivative moiety of the first compound 510, the polymerizable group of the second compound 520, and the hydrocarbon moiety of the fourth compound 540 may be aligned in the first alignment layer 601 to be oriented toward the liquid crystal layer 300'.

For example, the hydrophilic groups of the first, second, and fourth compounds 510, 520, and 540 may be aligned in the second alignment layer 602 to be oriented toward the second substrate 200, and the benzoyl derivative moiety of the first compound 510, the polymerizable group of the second compound 520, and the hydrocarbon moiety of the fourth compound 540 may be aligned in the second alignment layer 602 to be oriented toward the liquid crystal layer 300'.

The liquid crystal 305 in the liquid crystal layer 300' may be induced by the first and second alignment layers 601 and 602 to be vertically aligned. The third compound 530 having no hydrophilic group may be uniformly mixed with the liquid crystal 305 and may thus be maintained to be dispersed in the liquid crystal layer 300'.

Thereafter, referring to FIGS. 9 through 16, light is applied with an electric field formed in a liquid crystal layer 300 (S150). The step of applying light (S150) may be the step of forming first and second liquid crystal alignment layers 411 and 421 by at least partially photo-curing the second compound in the first and second alignment layers 601 and 602 and the third compound 530 in the liquid crystal layer 300.

In a case where liquid crystal (305a and 305b) in the liquid crystal layer 300 have negative dielectric anisotropy, the liquid crystal (305a and 305b) may be realigned such that the long axes thereof intersect the direction of an electric field formed in the liquid crystal layer 300. For example, first liquid crystal 305a adjacent to the first substrate 100 and second liquid crystal 305b adjacent to the second substrate 200 may be maintained to be tilted at a predetermined angle with respect to the normal line to the surfaces of the first and second substrates 100 and 200. As the first liquid crystal 305a and the second liquid crystal 305b are tilted, the long axes of the first, second, and third compounds 510, 520, and 530 in the first and second alignment layers 601 and 602 may be tilted at a similar angle to the liquid crystal (305a and 305b).

The step of applying light (S150) may be the step of applying light from the first substrate 100, which is a lower substrate. In a case where the second substrate 200 includes the first wavelength band filters 220 and the second wavelength band filter 260, which at least partially overlaps with the first wavelength band filters 220, and the wavelength band of light that the first wavelength band filters 220 allow to be transmitted overlaps with the wavelength band of light that the second wavelength band filter 260 blocks from being transmitted, the light transmittance of the second substrate 200 may be considerably low. Thus, light can be applied from the first substrate 100, which has a relatively high light transmittance, and as a result, the efficiency of exposure can be improved. Here, the light may be light having a peak wavelength of about 240 nm to 260 nm, about 270 nm to 280 nm, about 330 nm to 340 nm, or about 360 nm to 370 nm.

In response to light being applied to the first and second alignment layers 601 and 602, the first alignment layer 601, which is disposed on the surface of the first substrate 100, may form the first liquid crystal alignment layer 411, and the second alignment layer 602, which is disposed on the surface of the second substrate 200, may form the second liquid crystal alignment layer 421.

The benzoyl derivative moiety of the first compound 510 may generate free radicals upon exposure to light, for example, UV radiation. Due to the free radicals, a polymerization reaction may be initiated or promoted between the second and third compounds 520 and 530 both having one or more polymerizable groups. That is, the benzoyl derivative moiety of the first compound 510 may act as an initiator group.

As already described above, the second compound 520 may be tilted with respect to the surfaces of the first and second substrates 100 and 200. That is, the second compound, which forms monolayers in the first and second alignment layers 601 and 602, may be photopolymerized in its tilted state and may thus form polymerized monolayers. As the second compound 520, which is a monomer, is polymerized in its tilted state, the second compound 520 can contribute to the formation of the pretilt of the liquid crystal (305a and 305b) in the liquid crystal layer 300.

In the step of applying light (S150), the content of the third compound 530 in the liquid crystal layer 300 may decrease. For example, the third compound 530, which is uniformly dispersed in the liquid crystal layer 300, may be photopolymerized and may thus form a polymer 550. That is, at least some of the third compound 530 may form a polymer together with the second compound 520. In this manner, the first and second liquid crystal alignment layers 411 and 421, which comprise monolayers of the first compound 510, the second compound 520, the third compound 530 and the fourth compound 540, and a polymer 550 of the second compound 520 and/or the third compound 530, may be formed.

Figure 17:
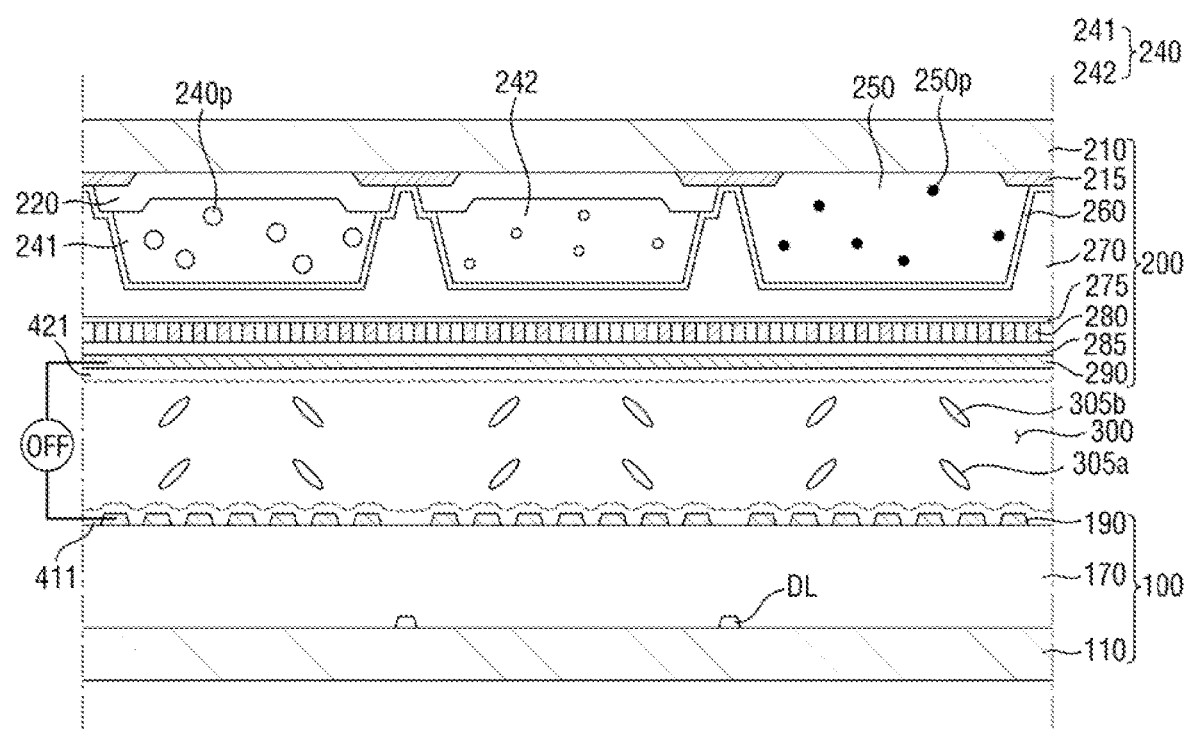
FIG. 17 is a cross-sectional view illustrating a liquid crystal layer with an electric field released therefrom.

FIG. 17 shows that the pretilt angles of first liquid crystal 305a and second liquid crystal 305b can be maintained even in the absence of an electric field because the inclination directions of the first liquid crystal 305a and the second liquid crystal 305b are fixed and stabilized by first and second liquid crystal alignment layers 411 and 421. In some exemplary embodiments, the first liquid crystal 305a and the second liquid crystal 305b may have different pretilt angles.

The method of manufacturing an LCD device according to an exemplary embodiment of the present disclosure can form monolayers and polymerized monolayers in a relatively simple manner using the self-alignment and/or polymerization characteristics of the first, second, third, and fourth compounds 510, 520, 530, and 540. The monolayers and the polymerized monolayers have an excellent alignment performance for the liquid crystal 305 and can thus vertically align the liquid crystal 305. Accordingly, a polymer-based alignment layer such as, for example, a polyimide (PI)-based alignment layer, can be omitted, and the degradation of the characteristics of a wavelength shift material 240p, which is susceptible to high temperature, can be prevented.

Also, since a polymerization reaction can be promoted by the benzoyl derivative moiety of the first compound 510, which is sensitive to light, sufficiently polymerized monolayers can be formed in the first liquid crystal alignment layer 411 and/or the second liquid crystal alignment layer 421 with a relatively small amount of exposure. Also, even in a case where the light transmittance of the second substrate 200 is remarkably low and the first substrate 100 comprises an opaque metal and thus also has a low light transmittance, a photopolymerization reaction can be properly performed even with a small amount of exposure.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display (LCD) device comprising:
a first substrate;
a liquid crystal layer disposed on the first substrate, the liquid crystal layer including a liquid crystal compound; and
a first liquid crystal alignment layer disposed between the first substrate and the liquid crystal layer,
wherein the liquid crystal compound includes a first compound, which has at least one hydrophilic group bonded to one end of a core structure thereof and a benzoyl derivative moiety bonded to the other end of the core structure thereof, and
the core structure of the first compound includes a mesogenic skeleton, and
the benzoyl derivative moiety of the first compound is represented by any one of Formulas Ia through Ie:

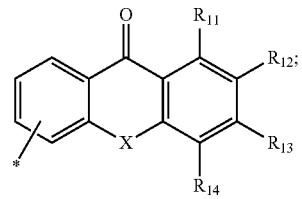

<Formula Ia>

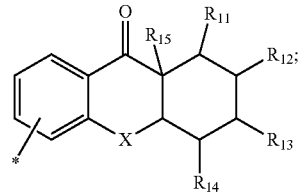

<Formula Ib>

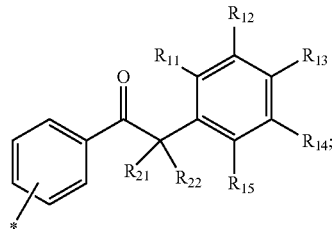

<Formula Ic>

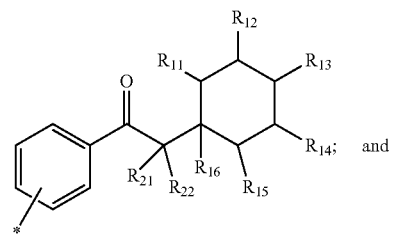

<Formula Id> and

-continued

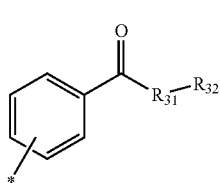

<Formula Ie> where $R_{11}$, $R_{12}$, $R_{13}$, $R_{14}$, $R_{15}$, and $R_{16}$ are each independently hydrogen, a hydroxyl group, a $C_{1-5}$ alkyl group or a $C_{1-5}$ alkoxy group, $R_{21}$ and $R_{22}$ are each independently hydrogen, a hydroxyl group, a $C_{1-5}$ alkyl group or a $C_{1-5}$ alkoxy or phenyl group, $R_{31}$ is a straight or branched $C_{1-5}$ alkylene group, $R_{32}$ is hydrogen or a hydroxyl group, and X is absent, or is oxygen, sulfur, or a carbonyl group, and \* is a bonding site.

2. The LCD device of claim 1, wherein the first liquid crystal alignment layer further includes,
 a polymer of a second compound, the second compound has at least one hydrophilic group bonded to one end of a core structure thereof and a polymerizable group bonded to the other end of the core structure thereof, wherein the hydrophilic group of the second compound is the same as or different from the hydrophilic group of the first compound, or
 a polymer of a third compound, the third compound has polymerizable groups bonded to both ends of a core structure thereof, wherein the polymerizable groups of the third compound is the same as or different from the polymerizable group of the second compound, and the core structure of the third compound is the same as or different from the core structure of the second compound.

3. The LCD device of claim 2, wherein the polymerizable group of the second compound and the polymerizable groups of the third compounds are each independently acryloyl groups, methacryloyl groups, acrylate groups, or methacrylate groups.

4. The LCD device of claim 2, wherein the first liquid crystal alignment layer further includes,
 a fourth compound, the fourth compound has at least one hydrophilic group bonded to one end of a core structure thereof, wherein the hydrophilic group and the core structure of the fourth compound are the same as or different from the hydrophilic group and the core structure of the second compound, and an aliphatic or aromatic hydrocarbon moiety is bonded to the other end of the core structure thereof.

5. The LCD device of claim 4, wherein
 the first compound, the second compound, and the fourth compound are aligned such that the hydrophilic groups thereof are oriented toward the first substrate, and
 liquid crystals are induced by the first liquid crystal alignment layer to be vertically aligned.

6. The LCD device of claim 1, further comprising:
 electrodes disposed between the first substrate and the first liquid crystal alignment layer,
 wherein the first liquid crystal alignment layer is in contact with the electrodes and the liquid crystal layer.

7. The LCD device of claim 1, wherein the liquid crystal layer further includes at least one of:

a second compound, the second compound having at least one hydrophilic group bonded to one end of a core structure thereof and a polymerizable group bonded to the other end of the core structure thereof,
 a third compound, the third compound having polymerizable groups bonded to both ends of a core structure thereof, and
 a fourth compound, the fourth compound having at least one hydrophilic group bonded to one end of a core structure thereof and an aliphatic or aromatic hydrocarbon moiety bonded to the other end of the core structure thereof.

8. The LCD device of claim 1, further comprising:
 a second substrate disposed on the liquid crystal layer; and
 a second liquid crystal alignment layer disposed between the liquid crystal layer and the second substrate,
 wherein the second liquid crystal alignment layer includes:
 the first compound;
 a polymer of a second compound or a third compound, the second compound having at least one hydrophilic group bonded to one end of a core structure thereof and a polymerizable group bonded to the other end of the core structure thereof, the third compound having polymerizable groups bonded to both ends of a core structure thereof, and
 a fourth compound, the fourth compound having at least one hydrophilic group bonded to one end of a core structure thereof and an aliphatic or aromatic hydrocarbon moiety bonded to the other end of the core structure thereof.

9. The LCD device of claim 8, wherein
 a surface of the first substrate that faces the second substrate has a concave curved surface, and
 the surface roughness of the first liquid crystal alignment layer is greater than the surface roughness of the second liquid crystal alignment layer.

10. A method of manufacturing an LCD device, the method comprising:
 preparing first and second substrates; and
 forming a liquid crystal layer between the first and second substrates by providing a liquid crystal composition including liquid crystal and a first compound, the first compound has at least one hydrophilic group bonded to one end of a core structure thereof and a benzoyl derivative moiety bonded to the other end of the core structure thereof, and
 the core structure of the first compound includes a mesogenic skeleton, and
 the benzoyl derivative moiety of the first compound is represented by any one of Formulas Ia through Ie:

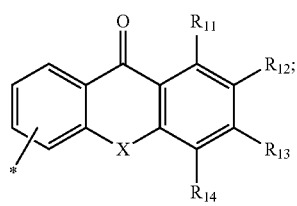

<Formula Ia>

-continued

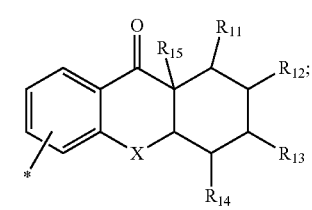
<Formula Ib>

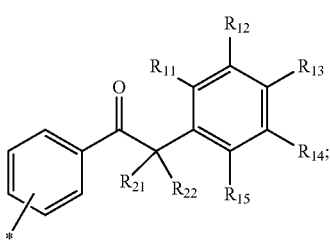
<Formula Ic>

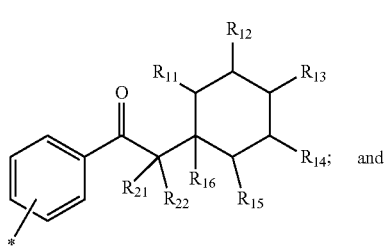
<Formula Id> and

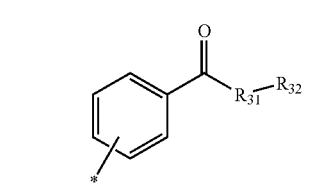
<Formula Ie> where
$R_{11}$, $R_{12}$, $R_{13}$, $R_{14}$, $R_{15}$, and $R_{16}$ are each independently hydrogen, a hydroxyl group, a $C_{1-5}$ alkyl group or a $C_{1-5}$ alkoxy group,
$R_{21}$ and $R_{22}$ are each independently hydrogen, a hydroxyl group, a $C_{1-5}$ alkyl group or a $C_{1-5}$ alkoxy or phenyl group,
$R_{31}$ is a straight or branched $C_{1-5}$ alkylene group,
$R_{32}$ is hydrogen or a hydroxyl group, and
X is absent, or is oxygen, sulfur, or a carbonyl group, and * is a bonding site.

11. The method of claim 10, wherein the liquid crystal composition further includes,
a second compound, the second compound has at least one hydrophilic group bonded to one end of a core structure thereof and a polymerizable group bonded to the other end of the core structure thereof,
a third compound, the third compound has polymerizable groups bonded to both ends of a core structure thereof, and
a fourth compound, the fourth compound has at least one hydrophilic group bonded to one end of a core structure thereof and an aliphatic or aromatic hydrocarbon moiety bonded to the other end of the core structure thereof.

12. The method of claim 11, wherein the providing of the liquid crystal composition comprises placing the liquid crystal composition in contact with electrodes exposed on the first or second substrate.

13. The method of claim 11, wherein the forming the liquid crystal layer, comprises: forming a first alignment layer by aligning at least some of the first, second, and fourth compounds such that the hydrophilic groups thereof are oriented toward the first substrate; and forming a second alignment layer by aligning at least some of the first, second, and fourth compounds so as for the hydrophilic groups thereof to be oriented toward the second substrate.

14. The method of claim 11, further comprising:
applying light with an electric field applied to the liquid crystal layer,
wherein
the first substrate includes a first base substrate and switching elements disposed on the first base substrate,
the second substrate includes a second base substrate, a first wavelength band filters disposed on the second base substrate, and a second wavelength band filter disposed to overlap with the first wavelength band filters,
a wavelength band of light that the first wavelength band filters allow to be transmitted overlaps with a wavelength band of light that the second wavelength band filters blocks from being transmitted, and
the applying of light comprises applying light from the first substrate toward the liquid crystal layer.

15. The method of claim 11, further comprising:
applying light with an electric field applied to the liquid crystal layer,
wherein the applying light, comprises polymerizing the second compound or the third compound by generating free radicals from the benzoyl derivative moiety bonded to the other end of the first compound.

16. The method of claim 10, further comprising, before the providing the liquid crystal composition:
hydrophilically treating a surface of the first or second substrate so as for the surface of the first or second substrate to have a contact angle of about 70° or less with respect to distilled water,
wherein the hydrophilicity of the surface of the first substrate, placed in contact with the liquid crystal composition, differs from the hydrophilicity of the surface of the second substrate, placed in contact with the liquid crystal composition.

17. A liquid crystal composition comprising:
a liquid crystal compound; and
a first compound having at least one hydrophilic group bonded to one end of a core structure thereof and a benzoyl derivative moiety bonded to the other end of the core structure thereof,
the core structure of the first compound includes a mesogenic skeleton, and
the benzoyl derivative moiety of the first compound is represented by any one of Formulas Ia through Ie:

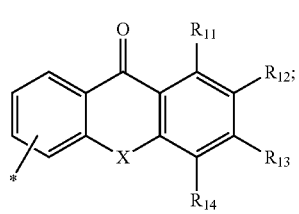
<Formula Ia>

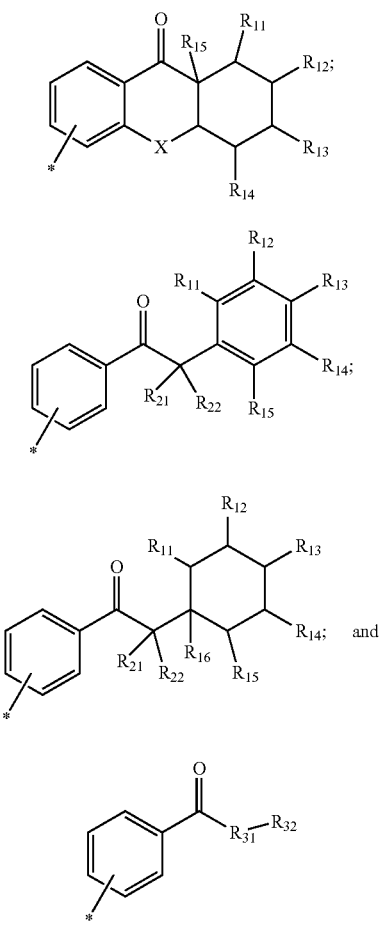

where $R_{11}$, $R_{12}$, $R_{13}$, $R_{14}$, $R_{15}$, and $R_{16}$ are each independently hydrogen, a hydroxyl group, a $C_{1-5}$ alkyl group or a $C_{1-5}$ alkoxy group, $R_{21}$ and $R_{22}$ are each independently hydrogen, a hydroxyl group, a $C_{1-5}$ alkyl group or a $C_{1-5}$ alkoxy or phenyl group, $R_{31}$ is a straight or branched $C_{1-5}$ alkylene group, $R_{32}$ is hydrogen or a hydroxyl group, and X is absent, or is oxygen, sulfur, or a carbonyl group, and * is a bonding site.

18. The liquid crystal composition of claim 17, further comprising:

a second compound, the second compound has at least one hydrophilic group bonded to one end of a core structure thereof and a polymerizable group bonded to the other end of the core structure thereof;

a third compound, the third compound has polymerizable groups bonded to both ends of a core structure thereof; and a fourth compound, the fourth compound has at least one hydrophilic group bonded to one end of a core structure thereof and an aliphatic or aromatic hydrocarbon moiety bonded to the other end of the core structure thereof.

19. The liquid crystal composition of claim 18, wherein the first compound is contained in an amount of about 0.1 wt % to about 30.0 wt % based on the sum of the weights of the first compound, the second compound, the third compound, and the fourth compound, and the third compound is contained in an amount of about 0.1 wt % to about 0.8 wt % based on the total weight of the liquid crystal composition.

* * * * *